United States Patent
Mau et al.

(10) Patent No.: US 11,908,053 B2
(45) Date of Patent: Feb. 20, 2024

(54) METHOD, NON-TRANSITORY COMPUTER-READABLE STORAGE MEDIUM, AND APPARATUS FOR SEARCHING AN IMAGE DATABASE

(71) Applicant: CAMELOT UK BIDCO LIMITED, London (GB)

(72) Inventors: Sandra Mau, Pittsburgh, PA (US); Joshua Song, Capalaba (AU); Sabesan Sivapalan, Heathwood (AU); Sreeja Krishnan, Pittsburgh, PA (US)

(73) Assignee: CAMELOT UK BIDCO LIMITED, London (GB)

( * ) Notice: Subject to any disclaimer, the term of this patent is extended or adjusted under 35 U.S.C. 154(b) by 330 days.

(21) Appl. No.: 17/333,707

(22) Filed: May 28, 2021

(65) Prior Publication Data
US 2021/0374460 A1    Dec. 2, 2021

Related U.S. Application Data

(60) Provisional application No. 63/032,432, filed on May 29, 2020.

(51) Int. Cl.
*G06T 7/10* (2017.01)
*G06T 11/60* (2006.01)
(Continued)

(52) U.S. Cl.
CPC .............. *G06T 11/60* (2013.01); *G06T 7/10* (2017.01); *G06V 10/26* (2022.01); *G06V 10/454* (2022.01);
(Continued)

(58) Field of Classification Search
CPC .. G06F 16/50–587; G06T 11/00; G06T 11/60; G06T 7/10; G06T 2207/20084; G06T 2210/12; G06V 10/00–993
See application file for complete search history.

(56) References Cited

U.S. PATENT DOCUMENTS 6,446,099 B1 * 9/2002 Peairs ................... G06F 16/583
707/E17.02
10,121,072 B1 * 11/2018 Kekatpure ........... G06V 10/431
(Continued)

FOREIGN PATENT DOCUMENTS

WO    WO 2018/232378 A1    12/2018

OTHER PUBLICATIONS

Burrus "Part 3: Sketch3D: Training a Deep Neural Network to Perform Annotation Segmentation" http:/web.archive.org/ web/ 20200506074925/https://medium.com/@matthew.p.burruss/part-3-sketch3d-training-a-2d-u-net-neural-network-in-pytorch-to-perform-annotation-segmentation-a789d00b8842. Archived May 6, 2020 (Year: 2020).*
(Continued)

*Primary Examiner* — Sean T Motsinger
(74) *Attorney, Agent, or Firm* — Oblon, McClelland, Maier & Neustadt, L.L.P.

(57) ABSTRACT

A method for searching an image database, comprising receiving an adulterated image of an object, the adulterated image including object annotations for visual reference, applying a first neural network to the adulterated image, correlating a result of the applying the first neural network with each image of a reference database of images, the result including an edited image of the object and each image of the reference database of images including a reference object, and selecting, as a matching image, at least one image of the reference database of images having correlation values above a threshold correlation value. The method may include applying a masking to the adulterated image. The masking may include performing, via a second neural network, object recognition on the adulterated image, applying, based on the object recognition, computer vision to detect callout features relative to bounding boxes, and generating a contour mask of the object.

14 Claims, 22 Drawing Sheets

(51) Int. Cl.
*G06V 30/146* (2022.01)
*G06V 10/82* (2022.01)
*G06V 10/44* (2022.01)
*G06V 10/26* (2022.01)

(52) U.S. Cl.
CPC ............ *G06V 10/82* (2022.01); *G06V 30/147* (2022.01); *G06T 2207/20084* (2013.01); *G06T 2210/12* (2013.01)

(56) References Cited

U.S. PATENT DOCUMENTS

| | | | | |
|---|---|---|---|---|
| 10,496,884 B1* | 12/2019 | Nguyen | ............ | G06V 30/1916 |
| 10,750,036 B1* | 8/2020 | de Beus | ............... | H04N 1/3877 |
| 2005/0165747 A1* | 7/2005 | Bargeron | ............. | G06V 30/414 |
| | | | | 707/E17.022 |
| 2008/0222113 A1* | 9/2008 | Baba | ..................... | G06F 16/583 |
| | | | | 707/E17.02 |
| 2015/0178591 A1* | 6/2015 | Fergus | .................... | G06T 5/005 |
| | | | | 382/157 |
| 2018/0204111 A1 | 7/2018 | Zadeh et al. | | |
| 2019/0354756 A1 | 11/2019 | Goubalan et al. | | |
| 2020/0211187 A1* | 7/2020 | Zhang | ................. | A61B 5/4504 |
| 2021/0124979 A1* | 4/2021 | Andreotti | ............. | G06F 18/214 |
| 2021/0142097 A1* | 5/2021 | Zheng | .................... | G06V 10/25 |
| 2021/0306498 A1* | 9/2021 | Uejo | ........................ | H04N 1/62 |
| 2021/0374460 A1* | 12/2021 | Mau | ......................... | G06T 7/10 |

OTHER PUBLICATIONS

International Search Report and Written Opinion dated Aug. 31, 2021 in PCT/US21/35007, 17 pages.

* cited by examiner

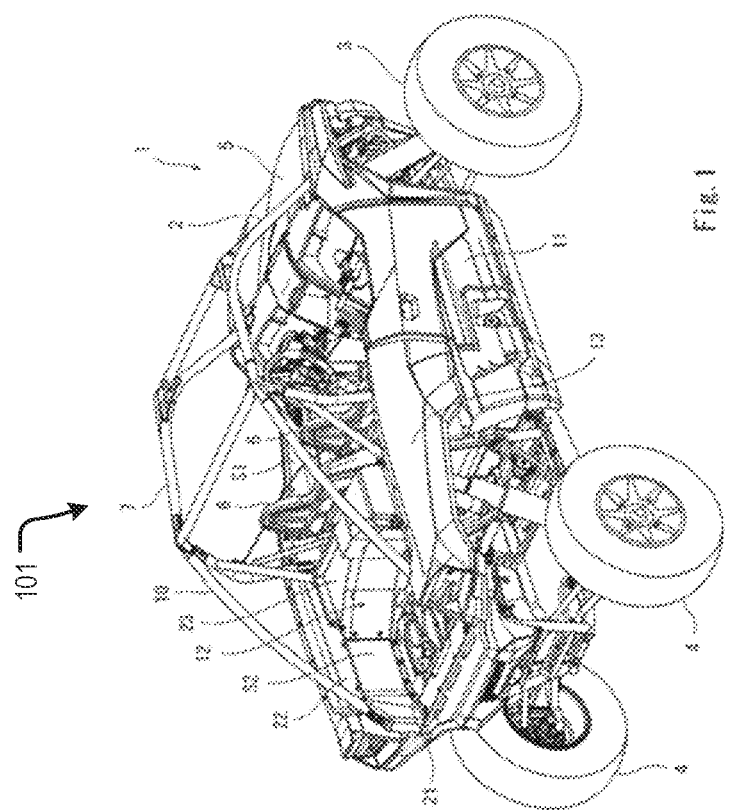

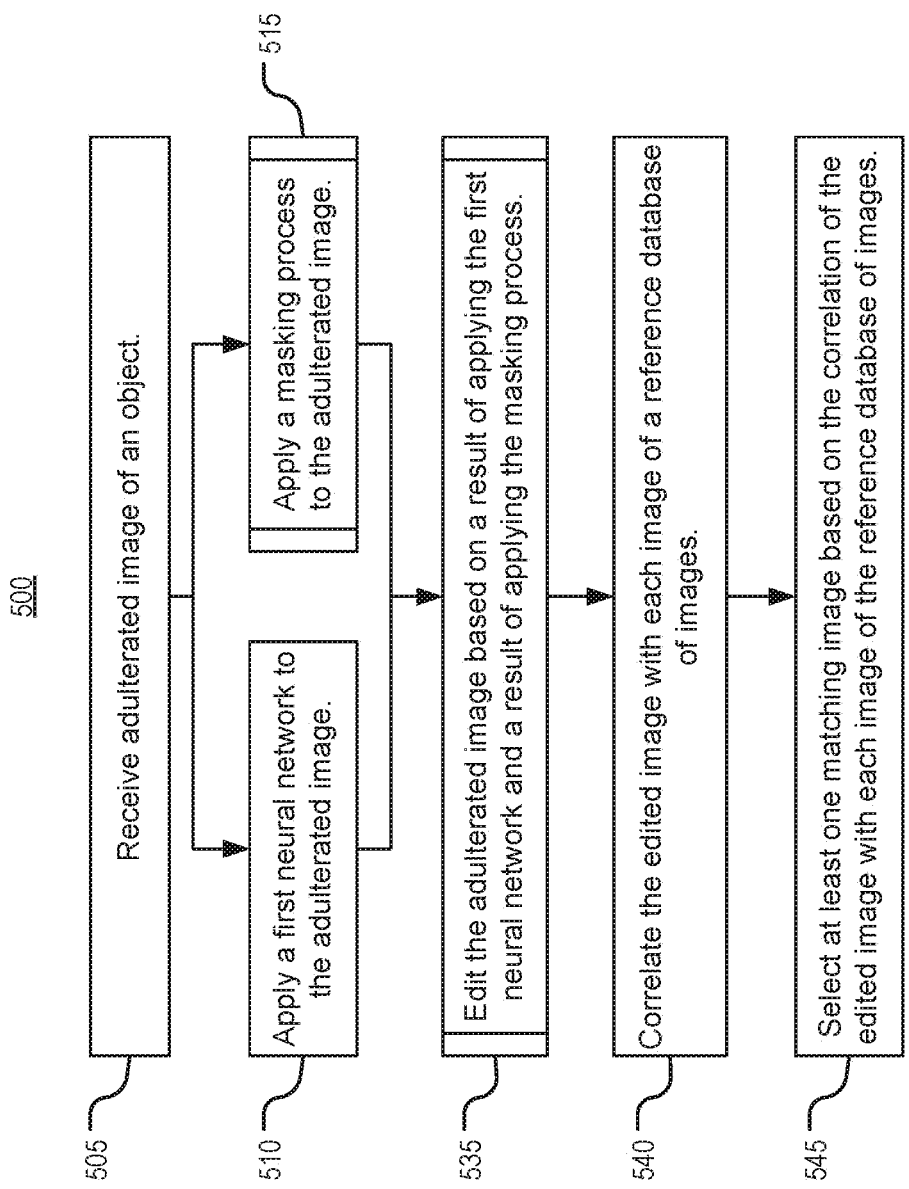

METHOD, NON-TRANSITORY COMPUTER-READABLE STORAGE MEDIUM, AND APPARATUS FOR SEARCHING AN IMAGE DATABASE

CROSS-REFERENCE TO RELATED APPLICATIONS

The present application claims priority to U.S. Provisional Application No. 63/032,432, filed May 29, 2020, the teaching of which is incorporated by reference herein in its entirety for all purposes.

BACKGROUND

Field of the Disclosure

The present disclosure relates to searching images having labels and annotations.

Description of the Related Art

Performing image searches is complicated by reference and/or sample images that include image noise such as annotations and labels. Such image noise can confuse existing image matching algorithms and may degrade their output as similar features of annotations and labels are incorrectly matched. This can be particularly impactful for patent images and patent image searches.

Accordingly, the present disclosure addresses these complications in order to achieve an image search tool broadly applicable and specifically tuned to patent image searching.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

The present disclosure relates to searching an image database.

According to an embodiment, the present disclosure further relates to a method for searching an image database, comprising receiving, by processing circuitry, an adulterated image of an object, the adulterated image including object annotations for visual reference, applying, by the processing circuitry, a first neural network to the adulterated image, correlating, by the processing circuitry, a result of the applying the first neural network with each image of a reference database of images, the result including an edited image of the object and each image of the reference database of images including a reference object, and selecting, by the processing circuitry and as a matching image, one or more images of the reference database of images having correlation values above a threshold correlation value.

According to an embodiment, the present disclosure further relates to a non-transitory computer-readable storage medium storing computer-readable instructions that, when executed by a computer, cause the computer to perform a method for searching an image database, comprising receiving an adulterated image of an object, the adulterated image including object annotations for visual reference, applying a first neural network to the adulterated image, correlating a result of the applying the first neural network with each image of a reference database of images, the result including an edited image of the object and each image of the reference database of images including a reference object, and selecting, as a matching image, one or more images of the reference database of images having correlation values above a threshold correlation value.

According to an embodiment, the present disclosure further relates to an apparatus for performing a method for searching an image database, comprising processing circuitry configured to receive an adulterated image of an object, the adulterated image including object annotations for visual reference, apply a first neural network to the adulterated image, correlate a result of the applying the first neural network with each image of a reference database of images, the result including an edited image of the object and each image of the reference database of images including a reference object, and select, as a matching image, one or more images of the reference database of images having correlation values above a threshold correlation value.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is an illustration of a mechanical drawing, according to an exemplary embodiment of the present disclosure;

FIG. 5 is a flow diagram of a method for searching an image database, according to an exemplary embodiment of the present disclosure:

DETAILED DESCRIPTION

Figure 2A:
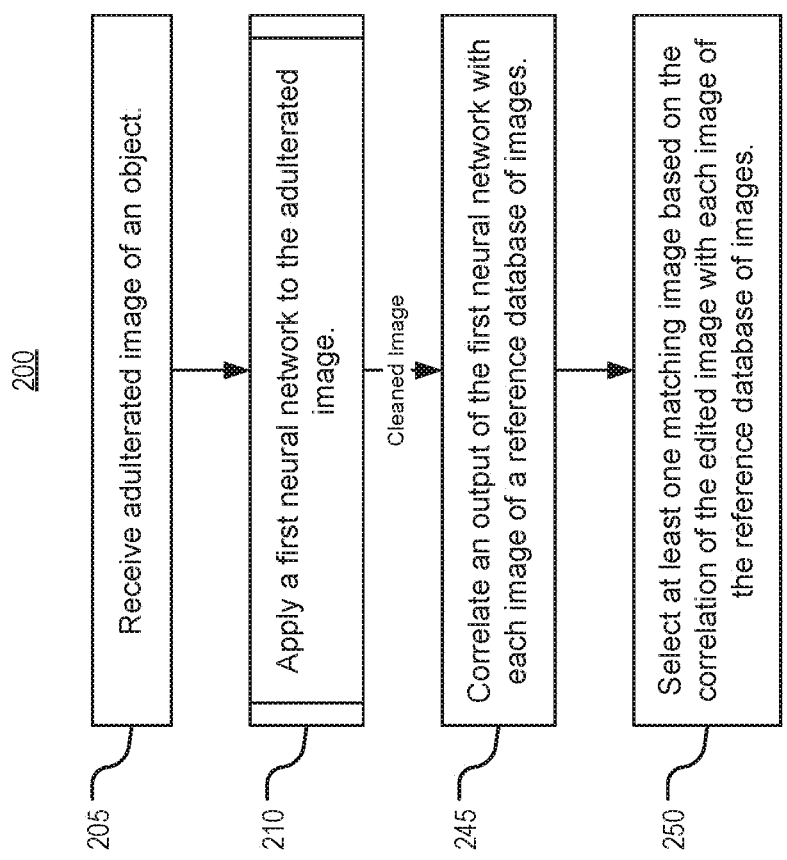
FIG. 2A is a flow diagram of a method for searching an image database, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment". "certain embodiments", "an embodiment", "an implementation". "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Content-based image retrieval, also known as query by image content and content-based visual information retrieval, is the application of computer vision techniques to the image retrieval problem. In other words, it is the problem of searching for digital images in large databases.

"Content-based" means that the search analyzes the contents of the image rather than the metadata such as keywords, tags, or descriptions associated with the image. The term "content" in this context might refer to colors, shapes, textures, or any other information that can be derived from the image itself. In an example, the term "content" may refer to the entire image. Content-based image retrieval is desirable because searches that rely purely on metadata are dependent on annotation quality and completeness. To this end, having humans manually annotate images by entering keywords or metadata in a large database can be time consuming and may not capture the keywords desired to describe the image.

Though any image may be subject to a content-based image retrieval search, the ability to perform accurate and efficient image searches is of critical import to regulatory offices that must compare images in order to determine whether a similar image has been previously registered. It can be readily appreciated that such as a system could be applied to intellectual property. In particular, such a method can be applied to patent examining and may serve as an aid to patent examiners seeking to compare patent drawings, or images, to images within a reference database of patent drawings.

Directly applying an image search to patent drawings, however, can be inefficient and inaccurate due to, as shown in FIG. 1, "noise" including callouts 101, text-based features, and other descriptive features that merely seek to point out or describe the underlying object that is the focus of the patent drawing. As a result, and understanding that similar underlying object may have different arrangements and types of noise, image search directly applied to the patent drawings can lead to inaccurate results arrived at in a cumbersome manner.

In addressing these deficiencies, the present disclosure describes a method, computer-readable medium, and apparatus for removing "noise" from images, thus allowing the image to be used for an image search. In particular, the methods of the present disclosure are applicable to patent drawings, wherein callouts, text-based features, and other descriptive features can be inconsistent and obfuscate the underlying object of the image.

According to an embodiment, the present disclosure describes a method for cleaning "noise" from patent drawings. The method can be deployed for generation of a reference image database or can be deployed in real-time upon searching a particular 'new' image.

According to an embodiment, the present disclosure describes a method for searching an image database, comprising receiving an adulterated image of an object and applying a first neural network to the adulterated image to identify and remove the "noise". The method further includes correlating a result of the applying the first neural network with each image of a reference database of images, the result including an edited image of the object and each image of the reference database of images including a reference object. The method further includes selecting, as a matching image, one or more images of the reference database of images having correlation values above a threshold correlation value.

According to an embodiment, optical character recognition methods may be integrated with the methods described herein. For instance, if able to identify reference numbers associated with callouts of a patent drawing, it may be possible to search for and find, based on the identified reference numbers, corresponding language within a specification of a patent application. Such a method could be included as a pre-processing step that aids in extensive searching applications.

As it relates to patents, and with reference now to the Drawings, it can be appreciated that drawings are often included in patent applications in order to explain the subject matter. These drawings contain "noise" such as callouts, text-based features, and other descriptive features. For instance, the drawings include annotations such as reference numbers, lead lines, and arrows, as shown in FIG. 1. Such annotations, however, as introduced above, can interfere with standard image recognition algorithms employed for image searching. Therefore, as described in the present disclosure, the annotations may be identified and removed to allow for generating a database of cleaned images or for generating a searchable image in real-time.

Figure 2B:
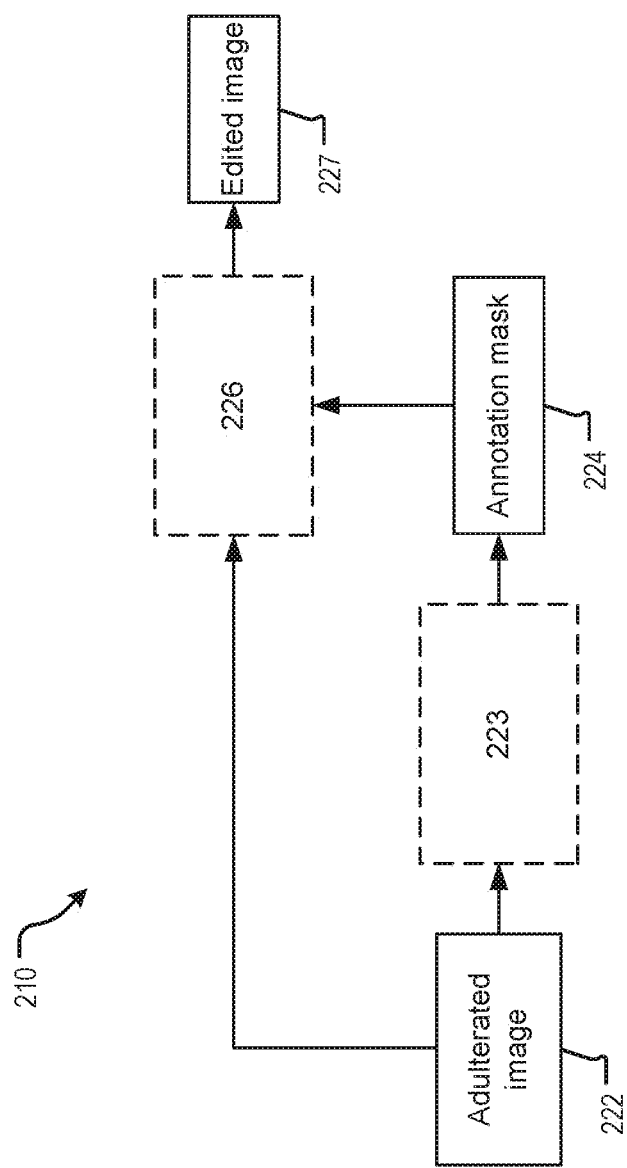
FIG. 2B is a schematic of the first neural network, according to an exemplary embodiment of the present disclosure.

According to an embodiment, and with reference now to FIG. 2A and FIG. 2B, a method 200 for image searching is described. It should be appreciated that method 200 may be performed in part or in whole by processing circuitry that is local or remote. For instance, a single device may perform each step of method 200 or a first device may send a request to a second device that performs processing.

At step 205 of method 200, an adulterated image of an object can be received. The adulterated image can be an image having "noise". In the context of a patent application, the adulterated image can be a patent drawing having annotations such as callouts, text-based features, and other descriptive features. By way of example, the patent drawing of FIG. 1 can be considered the adulterated image.

At sub process 210 of method 200, a first neural network can be applied to the adulterated image. In an embodiment, the first neural network can employ a pixel-level classification model. The neural network may be a convolutional neural network and the classification model may be trained through deep learning in order to detect annotations within the image.

In an embodiment, the first neural network may include at least one encoder/decoder network. The first neural network may be configured to perform a semantic segmentation task. Moreover, the first neural network may be configured to perform a scene segmentation task by capturing rich contextual dependencies based on the self-attention mechanism.

In an embodiment, the first neural network may comprise two modules, as shown in FIG. 2B and as later described with reference to a training phase shown in FIG. 10A. A first module 223 of the first neural network may receive, as an input, an adulterated image 222. The first module 223 of the first neural network may include, by way of example, a convolution layer and a deconvolution layer. After processing the adulterated image 222, the first module 223 of the first neural network may generate an annotation mask 224. The annotation mask 224 may then be used by a second module 226 of the first neural network in order to identify annotations and remove them from the adulterated image. To this end, the second module 226 of the first neural network may receive the adulterated image 222 and the annotation mask 224 generated by the first module 223 of the first neural network. The second module 226 of the first neural network may include, by way of example, a convolution layer and a deconvolution layer. The second module 226 of the first neural network may process the adulterated image 222 in view of the annotation mask 224 and output an edited image 227 that is devoid of annotations. Moreover, the output edited image 227 may include in-painting. In other words, in instances where an annotation crosses a line of the underlying object of the image and resides 'within' the underlying object, such annotation can be 'painted' white in order to remove it from the image.

In view of the above, it can be appreciated that a goal of the first neural network is to remove annotations from the adulterated image and to output a cleaned, edited image. For this reason, the second module 226 of the first neural network, without input from the first module 223 of the first neural network, may be used alone to output an edited image. However, it can also be appreciated that the second module 226 of the first neural network may not be as accurate and/or precise as desired, and so providing the annotation mask 224 to the second module 226 of the first neural network as, for example, an initial guess, improves not only accuracy and/or precision of the second module 226 of the first neural network but also the speed. Moreover, as it relates to training and FIG. 10A, the use of the first module of 223 of the first neural network in combination with the second module 226 of the first neural network improves training speed and training accuracy.

In an embodiment, the first module of the first neural network and the second module of the second neural network can be integrated with a pixel-level segmentation network. For example, the first neural network may include at least one encoder/decoder network combined with a UNet architecture. In one instance, the first neural network may be a single neural network. In another instance, the modules of the first neural network may be separate neural networks.

Figure 3:
FIG. 3 is an illustration of a result of a first neural network, according to an exemplary embodiment of the present disclosure.
Figure 4:
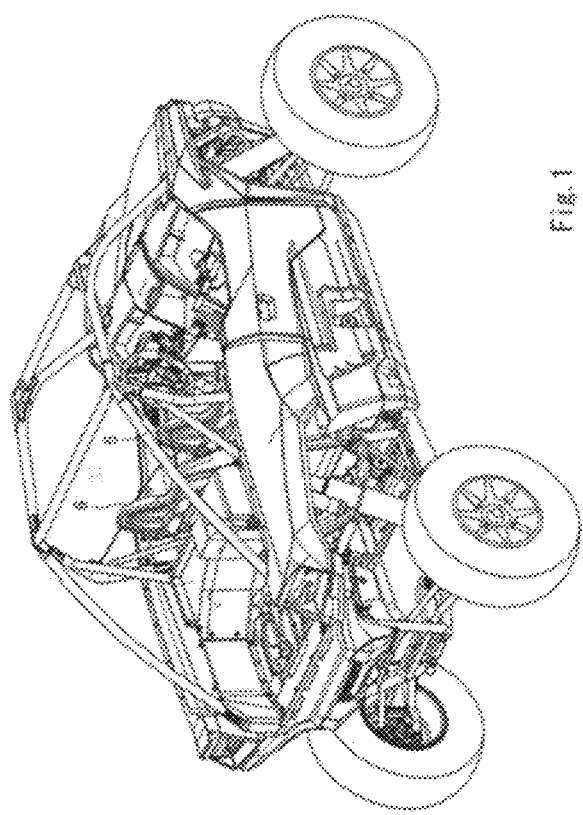
FIG. 4 is an illustration of a result of a first neural network, according to an exemplary embodiment of the present disclosure.

As described above, an output of the first module 223 of the first neural network may be an annotation mask, as shown in FIG. 3, wherein annotations remain but the underlying object of the adulterated image is removed. An output of the second module 226 of the first neural network may be a cleaned version of the adulterated image, as shown in FIG. 4, the identified annotations being removed from the adulterated image to render a cleaned image. Further, vacant space may be in-painted for visual fidelity.

Returning now to FIG. 2A, the cleaned, edited image can be processed at step 245 of method 200 as part of the image searching process. In particular, when the goal is to identify a matching image within a reference database of images, step 245 of method 200 can include determining correlations between the cleaned image and each image within the reference database of images.

At step 250 of method 200, the determined correlations can be evaluated in order to select at least one matching image. In an embodiment, the selection may be based on a ranking of the determined correlations, wherein a top n correlated images of the reference database of images are identified. In an embodiment, the selection may be based on a comparison of the determined correlations to a threshold correlation value, all images of the reference database of images being sufficiently correlated with the cleaned image being selected.

By performing method 200, a patent examiner, for instance, may be able to immediately identify a number of patent drawings and/or patent publications having images similar to that of the previously-adulterated image.

Upon visual inspection of FIG. 4, or the output of the first neural network of method 200, it can be appreciated that certain lines, arrows, and numbers remain and may complicate image searching. Thus, with reference now to FIG. 5, a method 500 for image searching is described, according to an exemplary embodiment of the present disclosure.

In an embodiment, method 500 employs the first neural network described with reference to FIG. 2A and FIG. 2B and a making process. The masking process may include computer vision techniques. The masking process may include, in an example, a second neural network. It should be appreciated that method 500 may be performed in part or in whole by processing circuitry that is local or remote. For instance, a single device may perform each step of method 500 or a first device may send a request to a second device that performs processing.

At step 505 of method 500, an adulterated image of an object can be received. The adulterated image can be an image having "noise". In the context of a patent application, the adulterated image can be a patent drawing having annotations such as callouts, text-based features, and other descriptive features. By way of example, the patent drawing of FIG. 1 can be considered the adulterated image.

At step 510 of method 500, a first neural network can be applied to the adulterated image. In an embodiment, the first neural network can employ a pixel-level classification model. The neural network may be a convolutional neural network and the classification model may be trained through deep learning in order to detect annotations within the image.

In an embodiment, and as described with reference FIG. 2B, the first neural network may be a neural network including two modules. An output of the first module of the first neural network may be a mask of the adulterated image, as shown in FIG. 3, wherein annotations remain but the underlying object of the adulterated image is removed. An output of the second module of the first neural network may be a cleaned version of the adulterated image, as shown in FIG. 4, the annotation mask from the first module of the first neural network being used to identify and remove annotations from the adulterated image to render a cleaned image.

Concurrently, at sub process 515 of method 500, a masking process, including a second neural network and computer vision techniques, can be applied to the adulterated image. In an embodiment, the second neural network is a label bounding box detector network configured to generate small bounding boxes around reference numbers and figure labels. The detected bounding boxes can then be used with computer vision techniques to detect arrows and lines. Together, the detected bounding boxes and the detected arrows and lines can be used to generate contour masks that isolate the annotations from the underlying object of the image.

Figure 6A:
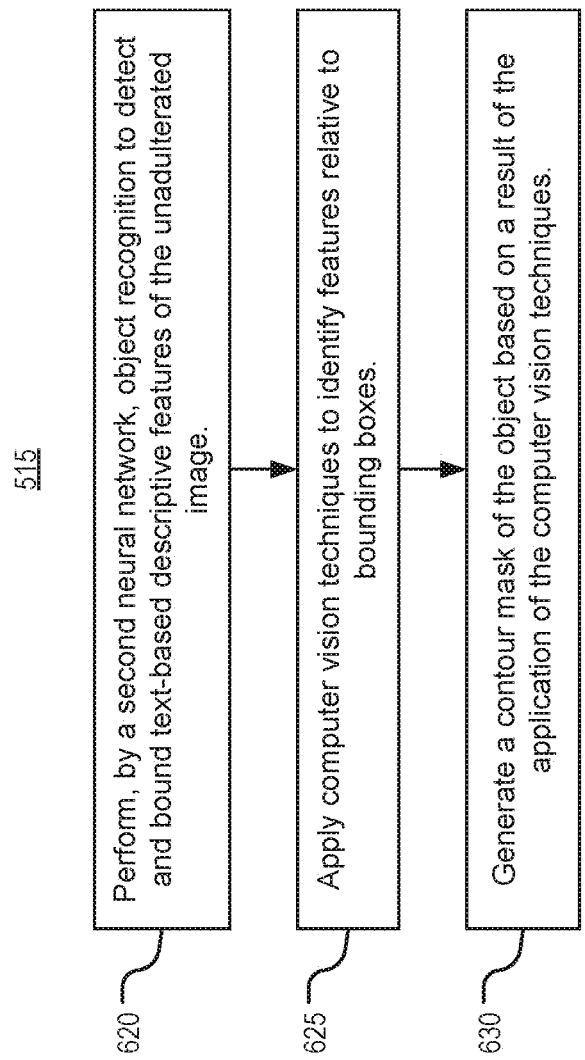
FIG. 6A is a flow diagram of a sub process of a method for searching an image database, according to an exemplary embodiment of the present disclosure.
Figure 6B:
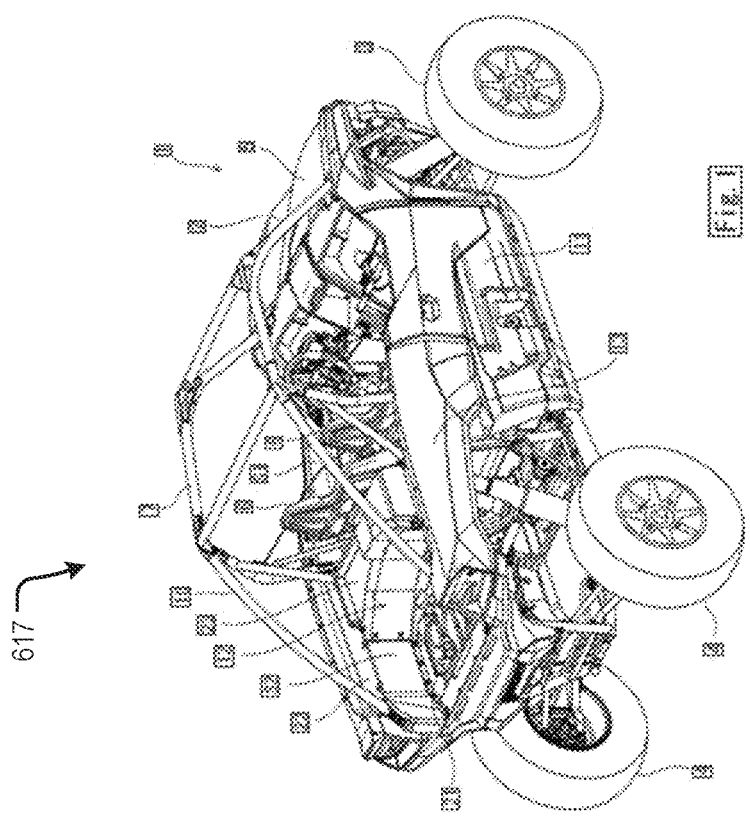
FIG. 6B is an illustration of a result of a second neural network, according to an exemplary embodiment of the present disclosure.
Figure 6C:
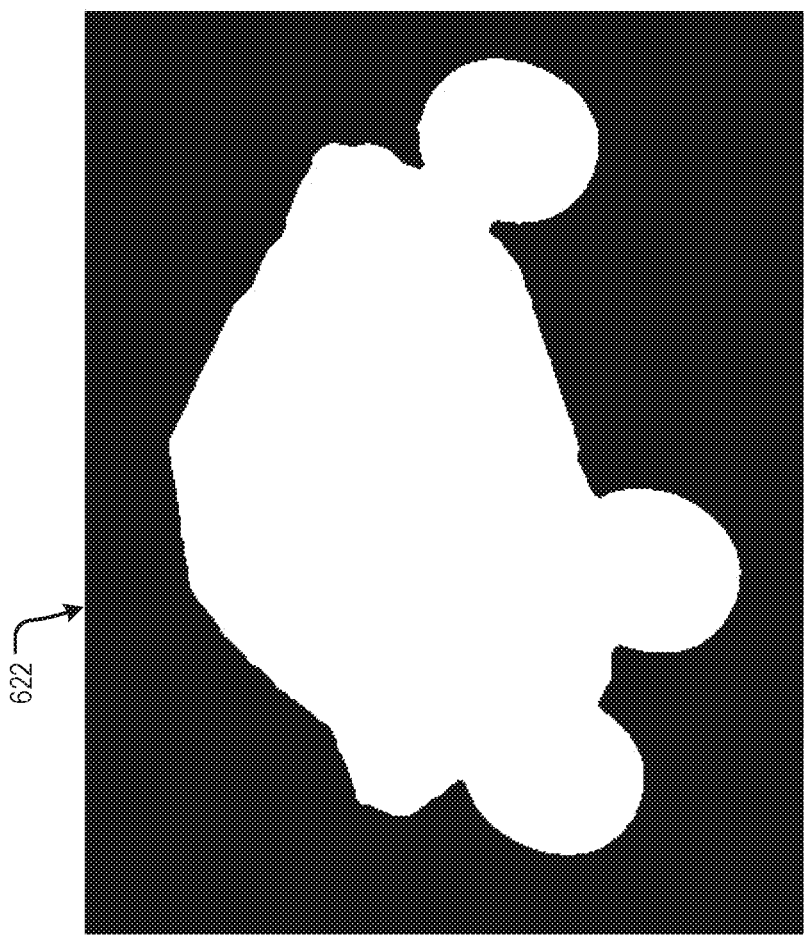
FIG. 6C is an illustration of a contour mask, according to an exemplary embodiment of the present disclosure.

In particular, and with reference now to FIG. 6A through FIG. 6C, the second neural network may be a convolutional neural network configured to perform object recognition on the adulterated image at step 620 of sub process 515. In an example, as shown in FIG. 6B with corresponding confidence values, the second neural network may be a deep learning-based neural network configured to identify reference numbers and generate bounding boxes 617 surrounding the reference numbers and figure labels. At step 625 of sub process 515, the deep learning-based neural network may be further configured to perform, in parallel or serially with the bounding box process, a computer vision technique to identify arrows and lines associated with the bounding boxes. Alternatively, step 625 of sub process 515 can be performed by an image processing technique. The image processing technique may include, for instance, a computer vision technique configured to perform, in parallel or serially with the bounding box process, identification of arrows and lines associated with the bounding boxes. In either instance, performance of step 625 of sub process 515 allows for identifying a main outline contour of the underlying object of the image. Accordingly, an output of sub process 515 may be a contour mask 622 associated with the underlying object of the image, as shown in FIG. 6C, generated at step 630 of sub process 515, the contour mask 622 isolating the underlying object of the image.

Returning now to FIG. 5, a result of applying the first neural network and a result of applying the masking process (i.e., the second neural network and the computer vision technique), separately or in any combination, can be combined at sub process 535 of method 500 in order to edit the adulterated image. For instance, the edited, cleaned image generated as the result of applying the first neural network can be combined, or fused, with the contour mask generated at sub process 515 of method 500.

Figure 7A:
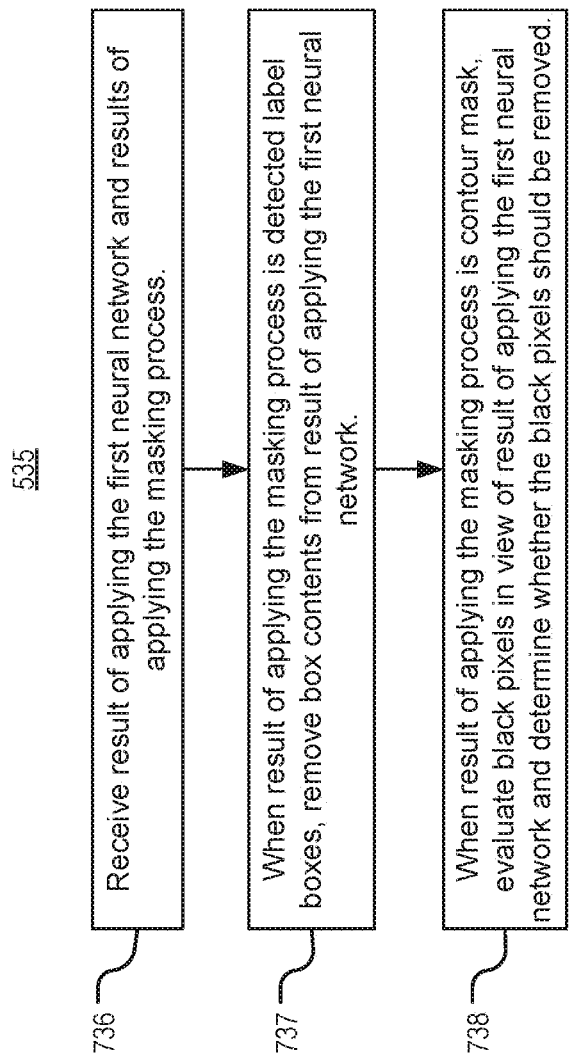
FIG. 7A is a flow diagram of a sub process of a method for searching an image database, according to an exemplary embodiment of the present disclosure.
Figure 7B:
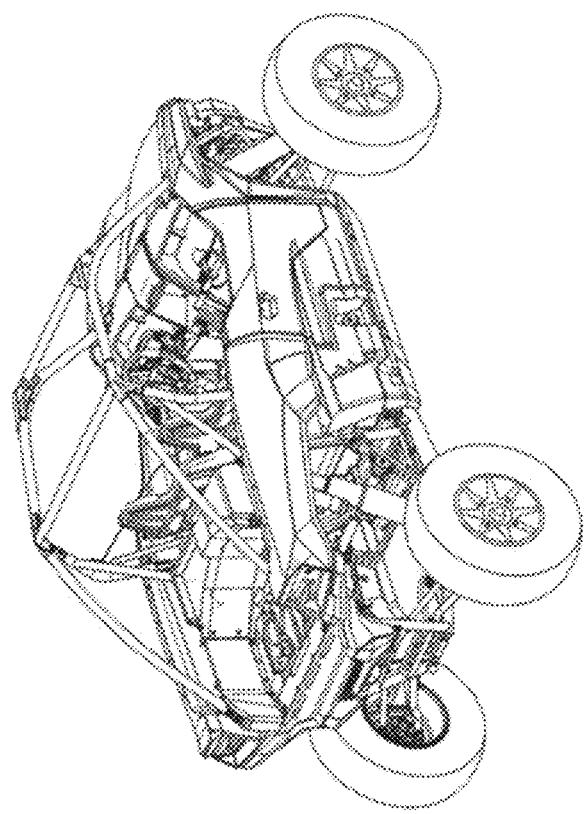
FIG. 7B is an illustration of an edited image, according to an exemplary embodiment of the present disclosure.

To this end, and with reference now to FIG. 7A and FIG. 7B, the fusion of the result of applying the first neural network and the result of applying the masking process can be performed according to sub process 535. At step 736 of sub process 535, the result of applying the first neural network and outputs of applying the masking process can be received. The outputs of applying the masking process can include the detected bounding boxes and the contour mask generated as the result of applying the masking process. Concurrently, the adulterated image may also be received. At step 737 of sub process 535, the detected bounding boxes are identified within the result of applying the first neural network (i.e. edited, cleaned image) and box contents are removed. At step 738 of sub process 535, the adulterated image is evaluated to identify, as regions, groups of connect black pixels. Each region can then be evaluated to determine if the region is outside the contour mask generated by applying the masking process, a distance between the region and the nearest bounding box is less than a box distance threshold, and an area of the region is less than a size threshold of the region. If it is determined that the region within the adulterated image satisfies these three conditions, the region can be erased from the edited, cleaned image output as a result of applying the first neural network.

The edited image generated at sub process 535 of method 500, an example of which is shown in FIG. 7B, can be provided to step 540 of method 500 and used as part of the image searching process. In particular, when the goal is to identify a matching image within a reference database of images, step 540 of method 200 can include determining correlations between the edited image and each image within the reference database of images.

At step 545 of method 500, the determined correlations can be evaluated in order to select at least one matching image. In an embodiment, the selection may be based on a ranking of the determined correlations, wherein a top n correlated images of the reference database of images are identified. In an embodiment, the selection may be based on a comparison of the determined correlations to a threshold correlation value, all images of the reference database of images being sufficiently correlated with the edited image being selected.

In an embodiment, features extracted from any of the first neural network, the second neural network, and/or the computer vision technique, separately or in any combination, may also be used, separately, for image searching without the need for generating a combined image. To this end, the cleaned image, or extracted features of an intermediary image, may be used as a searchable image (or features) for comparison with images of a reference database. As it relates to patents, this may allow for accurate searching of a database of patents to identify patent documents having related images. For instance, during examination of a patent application, an image of the pending application may be used as a query during a search of a patent document reference database, wherein results of the search are patent documents containing images that match the query image.

In other words, according to an embodiment, the present disclosure describes a method for searching a patent image database based on a received image input to identify one or more matching patent images. The method may include receiving an image of an object, the image being an annotated image from a patent application, in an example, applying a first neural network to the annotated image, generating, based on the application of the first neural network, a clean image of the annotated image, correlating the clean image of the object with each image of a reference database of images including objects, or images from published patent documents, in an example, and selecting, based on the correlation, one or more matching images that include a matching object. In an embodiment, the method may further include applying a masking process to the annotated image, the masking process including a second neural network configured to detect bounding boxes and a computer vision technique configured to identify arrows, lines, and the like. The detected bounding boxes and the identified arrows, lines, and the like may be used to generate a contour mask of the underlying object of the image, the contour mask being used in combination with the clean image generated by applying the first neural network to result in an edited, cleaned image of the underlying object of the image.

In another embodiment, the method may further comprise extracting a feature of the object based on the annotation mask, the clean image, and the contour mask, correlating the extracted feature of the object with features of each image of a reference database of images including objects, and selecting, based on the correlation, one or more matching images that include a matching object.

Further to the above, it can be appreciated that, in deep learning, many thousands of labelled images are typically required for training a classifier (e.g., a convolutional neural network (CNN) classifier). Often times, these labelled images are manually labeled, a task that requires a significant amount of time and computational resources. To this end, the present disclosure describes a synthetic data generation method. The synthetic data generation method can be configured to process patent design drawings without annotations, such as those in FIG. 8, and apply randomized annotations thereto.

The randomized annotations may be applied such that certain conditions are met, such as ensuring that lead lines do not cross each other and that the reference numbers do not overlap on the drawing.

Figure 9A:
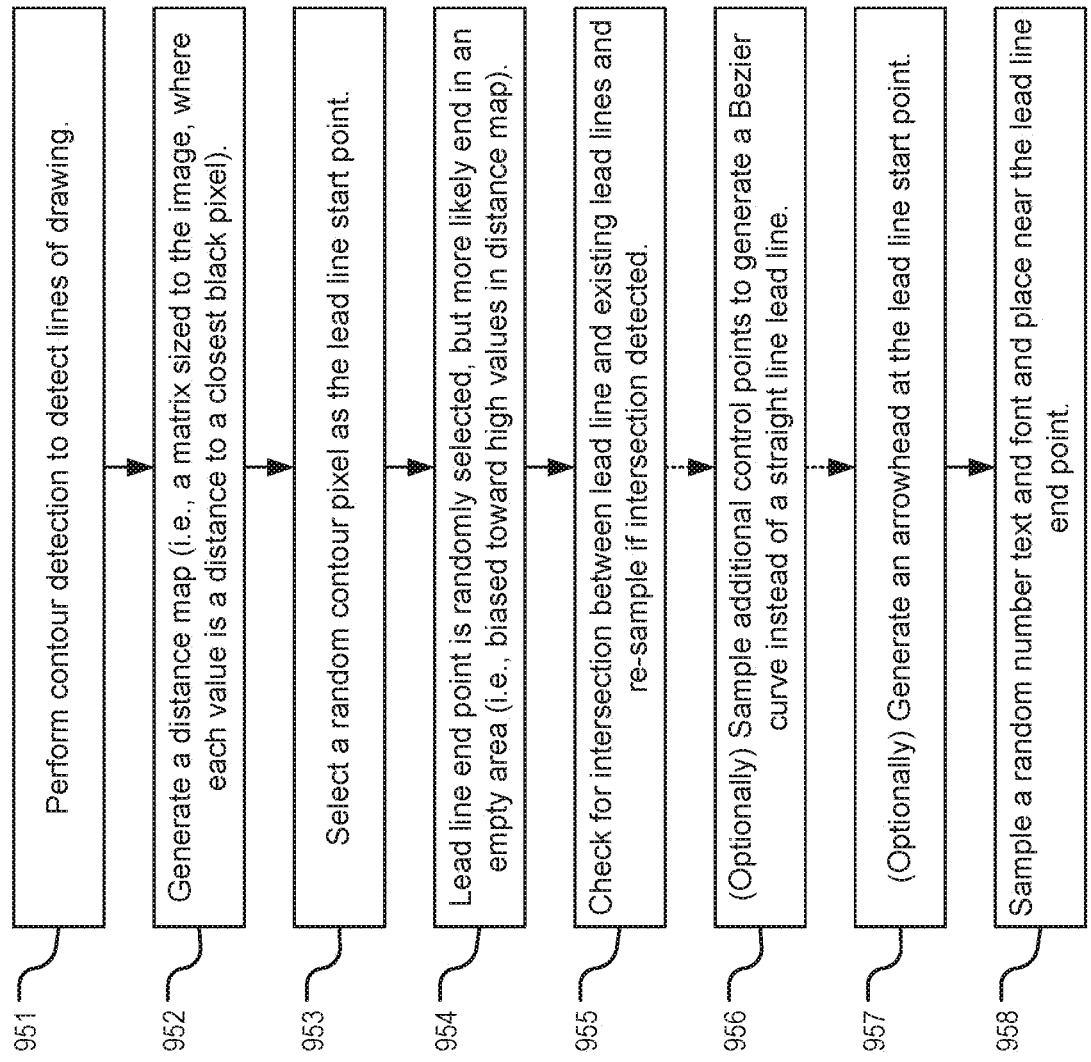
FIG. 9A is a flow diagram of a method for synthetically annotating a reference drawing, according to an exemplary embodiment of the present disclosure.

To this end, FIG. 9A provides a description of a method 950 of generating a synthetically annotated drawing is described. Method 950 is described in the context of generating a single callout, wherein the method 950 can be repeated in order to annotate an image as desired.

At step 951 of method 950, a contour detection is performed to detect lines of the underlying object of the image. At step 952 of method 950, a distance map can be generated. The distance map may be a matrix having a same size as the image, wherein each value of the matrix is a distance to a closest black pixel. At step 953 of method 950, a random contour pixel can be selected as a lead line start point. In an embodiment, a random perturbation can be added so that the lead line does not always start on the drawing line. At step 954 of method 950, a lead line end point can be randomly selected. The lead line end point may be biased toward empty areas of the image. In others, the selection of the lead line end point can be biased toward high values within the matrix (i.e., the distance map). At step 955 of method 950, a check may be performed to identify intersections between the lead line and existing lead lines. If an intersection is detected, the lead line may be regenerated. Step 956 and step 957 may be optionally performed. At step 956 of method 950, additional control points of the lead line can be sampled to generate a Bezier curve. At step 957 of method 950, an arrowhead can be generated at the lead line start point. Finally, at step 958 of method 950, a random number text and font can be sampled and placed near the lead line end point. Additional randomizations can be applied, including color shift and salt and pepper noise.

Figure 8:
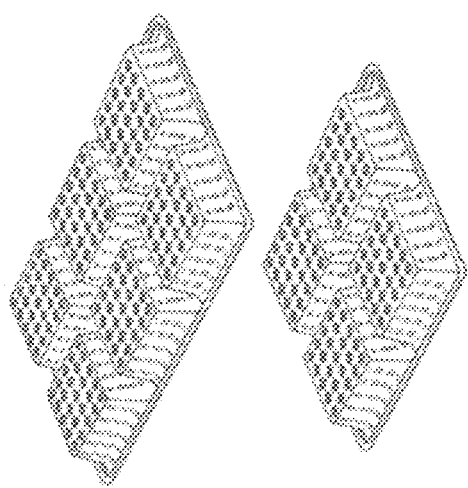
FIG. 8 is an illustration of a reference drawing used during a training phase, according to an exemplary embodiment of the present disclosure.
Figure 9C:
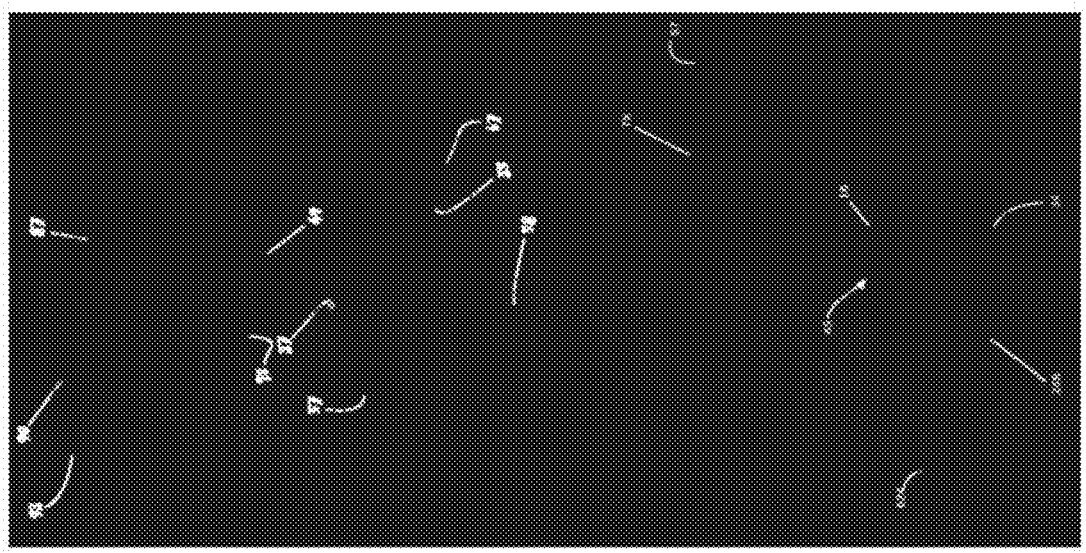
FIG. 9C is an illustration of results of a first neural network corresponding to synthetically-annotated reference drawings used during a training phase, according to an exemplary embodiment of the present disclosure.
Figure 9B:
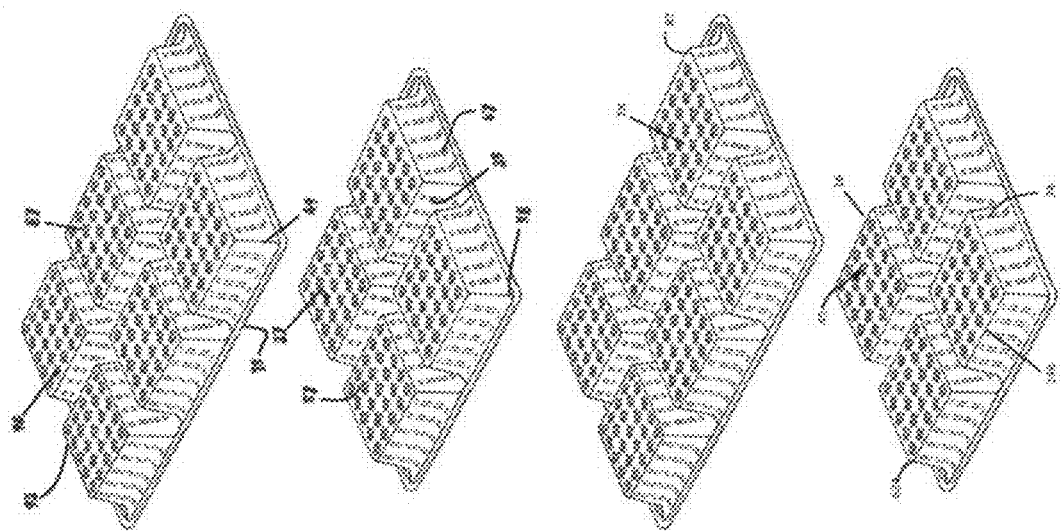
FIG. 9B is an illustration of synthetically annotated reference drawings used during a training phase, according to an exemplary embodiment of the present disclosure.

In view of method 950, FIG. 9B is an illustration of a synthetically annotated image. FIG. 8 can be used as a visual reference. FIG. 9C provides an isolated view of the synthetic annotations.

Further to the above, it can be appreciated that, as it relates to generation of a training database, the present disclosure provides a method for automatically, and without human intervention, generating a training database for training of a neural network.

Figure 10A:
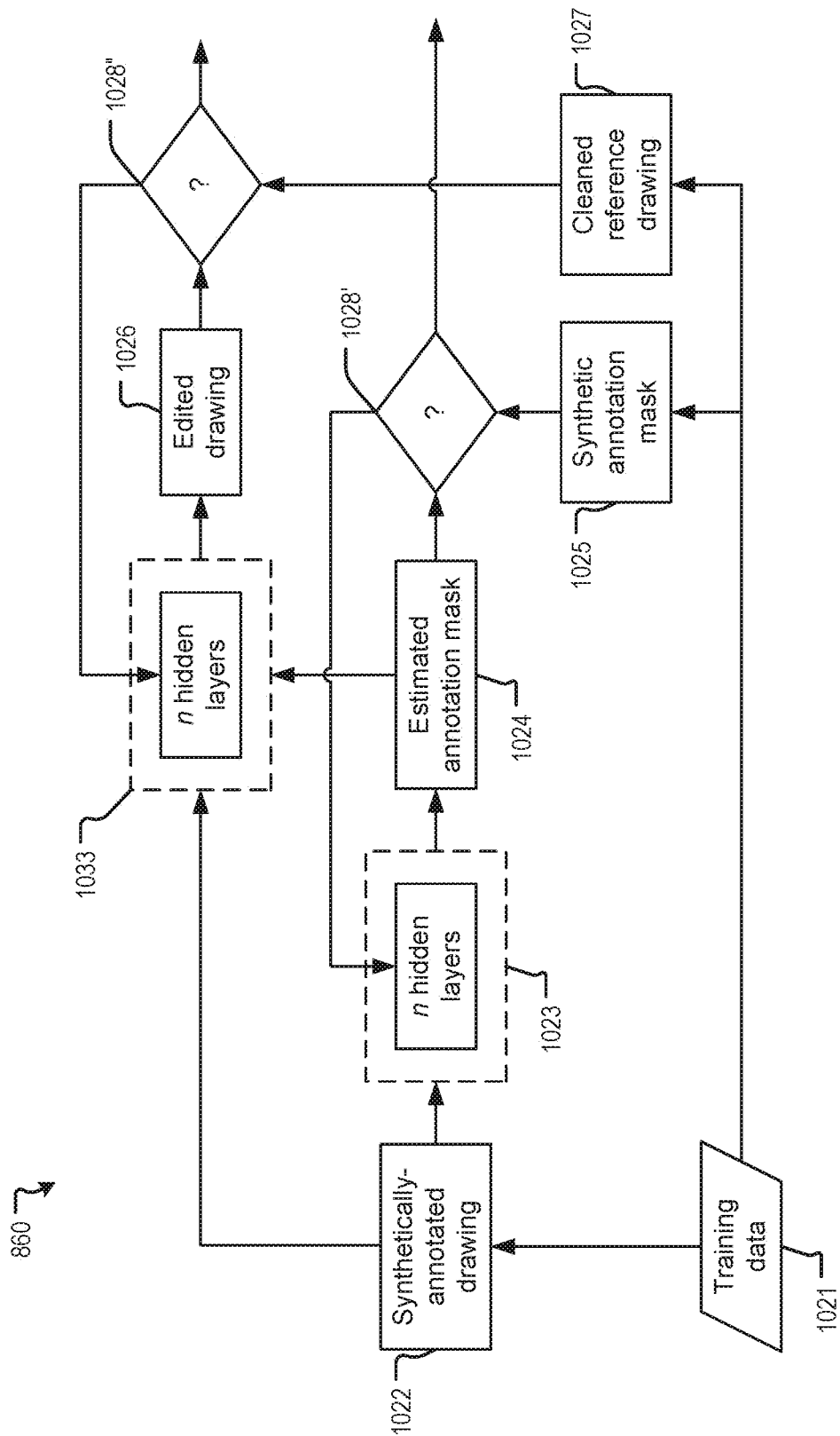
FIG. 10A is a flow diagram of a training phase of a neural network deployed in a method for searching an image database, according to an exemplary embodiment of the present disclosure.
Figure 10B:
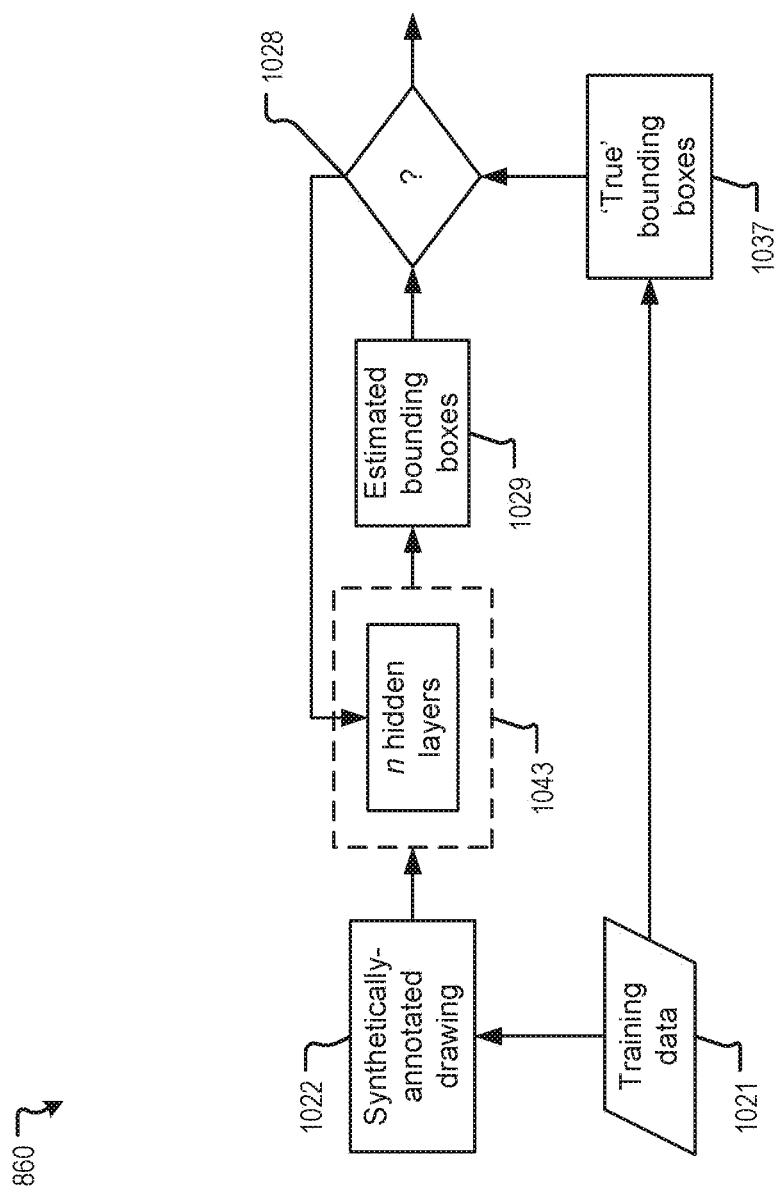
FIG. 10B is a flow diagram of a training phase of neural networks deployed in a method for searching an image database, according to an exemplary embodiment of the present disclosure.

Having synthetically generated the training database, the first neural network and the second neural network, described herein, can be trained according to the flow diagrams of FIG. 10A and FIG. 10B. Generally, particularly as it relates to FIG. 10A, unadulterated patent drawings (e.g., mechanical design drawings) may be processed in order to generate a synthetic annotation mask and a synthetically annotated image. The synthetically-annotated images may be used as training inputs and the synthetic annotation mask and the unadulterated image may be used as ground truth data. As it relates to FIG. 10B, the synthetically annotated image can be provided as training inputs and target bounding boxes can be used as ground truth data.

With reference to FIG. 10A, the first neural network can be divided into a first module 1023, which generates an annotation mask, and a second module 1033, which outputs a clean image with annotations removed. Each of the first module and the second module may include a convolution block and a deconvolution block. The convolution block, which may include of a series of convolution operations and pooling operations, captures and encodes information into image data. In order to learn the weights associated with the convolution/deconvolution processes, gradient backpropagation may be used with the goal of minimizing a loss function (e.g., mean square error), as will be described later. The annotation mask output from the first module, which may be a binary result, can be evaluated by binary cross-entropy. In this way, it can be appreciated that the first module is an easier problem to solve (i.e., it converges more quickly). Therefore, its output can be provided to the second module, as shown in FIG. 10A.

After each model is trained and deployed, the patent images are fed in place of the synthetically annotated images.

With reference to FIG. 10B, the second neural network can be an object recognition neural network. In particular, the second neural network may be a convolutional neural network (CNN)-based bounding box detector and may be trained on synthetic data in order to identify, reference numbers and figure numbers. In an example, a faster R-CNN architecture may be used, though other architectures may be employed without deviating from the spirit of the present disclosure. For instance, a first model iteration may be trained on pure synthetic data. This model may then be used to label real (i.e., non-synthetic) patent drawings, and these labels may be checked by a human validator. The human-validated data may then be used to fine-tune the model in a second iteration in order to improve its accuracy.

When the first neural network is a pixel-level CNN, it should be appreciated that the model may be imperfect and, occasionally, may generate missing annotations. Accordingly, the present disclosure describes the second neural network as an approach that can be performed in order to improve the output of the first neural network. As in FIG. 6A through FIG. 6C, contour detection, such as that available from the open-source OpenCV library, may be used to find the contours in the image. Main contours may be detected based on size. Lines outside of the main contour and ending near detected reference numbers are assumed to be lead lines and may be erased. Similarly, detected reference numbers may be erased.

According to an embodiment, CNN networks may be trained on the synthetic image data pair that has the image with the noise and without noise. An intermediate layer of this trained network may be used as an image feature to further improve the similarity score, disregarding the known noise type.

Returning now to the Figures, FIG. 10A and FIG. 10B are flow diagrams of a training phase 860 of neural networks employed in a method for searching an image database, according to an exemplary embodiment of the present disclosure. In particular, FIG. 10A and FIG. 10B correspond to neural networks employed within method 200 and within method 500 of the present disclosure.

The training phase 860 may include optimization of at least one neural network, which can vary with application and can include residual networks, convolutional neural networks, encoder/decoder networks, and the like.

Generally, each of the at least one neural network receives training data, or, for instance, a synthetically-labeled training image, as an input. Each of the at least one neural network may be configured to output separate data, but may output, for example, an estimated image, an estimated annotation mask, or an edited image, that is minimized relative to reference data. In an instance, as it relates to FIG. 10A, the training data 1021 may include a synthetically-annotated drawing 1022, a corresponding synthetic annotation mask 1025, and a corresponding cleaned drawing 1027. Training phase 860 may include estimation of annotation mask 1024 by a first module 1023 of the neural network and estimation of an edited image 1026 by a second module 1033 of the neural network. The estimated drawing 1026 and the estimated annotation mask 1024 can be compared with a cleaned drawing 1027 and a synthetic annotation mask 1025, respectively, in order to calculate an error between target values (i.e., 'true' values of the training data) and the estimated values. This error can be evaluated at 1028' and 1028" and allows the at least one neural network to iteratively update and improve its predictive power. In another instance, as it relates to FIG. 10B, the training data 1021 may include a synthetically-annotated drawing 1022 and corresponding 'true' bounding boxes 1037. The 'true' bounding boxes 1037 may be human-labeled, for instance, annotations. Training phase 860 may include estimation of bounding boxes 1029. The estimated bounding boxes 1029 can be compared with the 'true' bounding boxes 1037 in order to calculate an error between target values (i.e., 'true' values of the training data) and the estimated values. This error can be evaluated at 1028 and allows the at least one neural network to iteratively update and improve its predictive power.

Specifically, as it relates to FIG. 10A, which may be associated with the first neural network of the present disclosure, training phase 860 may include training of a first module 1023 of the first neural network and a second module 1033 of the first neural network.

Training each module of the first neural network, and/or the first neural network at large, may proceed as described with respect to FIG. 10A.

In an embodiment, training the modules of the first neural network begins with obtaining training data 1021 from the training database. The training data can include the synthetically-annotated drawing 1022 and a corresponding synthetic annotation mask 1025, the corresponding synthetic annotation mask 1025 being generated based on the synthetically-annotated drawing 1022. The synthetically-annotated drawing 1022 can be provided as an input layer of the first module 1023 of the first neural network. The input layer can be provided to hidden layers of the first module 1023 of the first neural network. In the event the architecture of the first module 1023 of the neural network follows the convolution/deconvolution description of above, the hidden layers may include a contracting phase comprising one or more of convolutional layers, concatenation layers, sub sampling layers, pooling layers, batch normalization layers, and activation layers, among others, and an expansion phase comprising convolutional layers, concatenation layers, upsampling layers, inverse sub sampling layers, and summation layers, among others. The activation layers may employ a rectified linear unit (ReLU). An output of the hidden layers of becomes the input for an output layer. The output layer may be a fully connected layer, in an example. An estimated annotation mask 1024 can then be output from the first module 1023 of the first neural network. In an embodiment, the output can be compared with the corresponding synthetic annotation mask 1025 at step 1028'. In practice, a loss function defined therebetween can be evaluated at step 1028' to determine if stopping criteria of the training phase 860 have been met. If it is determined that an error criterion is met and the loss function has been minimized, or stopping criteria have otherwise been met, the first module 1023 of the first neural network is determined to be sufficiently trained and ready for implementation with unknown, real-time data. Alternatively, if it is determined that the error criterion is not met and the loss function has not been minimized, or stopping criteria have otherwise not been met, the training phase 860 is repeated and updates are made to weights/coefficients of the first module of the first neural network.

According to an embodiment, and as the output from the first module 1023 of the first neural network is binary, the loss function of the first module 1023 of the first neural network can be defined as a binary cross-entropy/log loss between the estimated annotation mask output from the first module 1023 of the first neural network (mask$_{NN}$) and the corresponding synthetic annotation mask (mask$_{synthetic}$), or $$\Sigma - (y \log(p) + (1-y) \log(1-p))$$

where y is the ground truth synthetic annotation mask 1025, y having a value of 0 for a black pixel and 1 for a white pixel, and p is the probability output from the first module 1023 of the first neural network, p being between 0 and 1 with the goal being to match y. The loss function can be summed over all pixels of the image.

Training the first neural network continues with the second module 1033 of the first neural network. To improve training, the output of the first module 1023 of the first training network can be provided as an input, along with the synthetically annotated drawing 1022, to the second module 1033 of the first neural network. Training the second module 1033 of the first neural network begins with obtaining training data from a training database 1021. The training data can include a synthetically-annotated drawing 1022 and a corresponding cleaned drawing 1027, the corresponding cleaned drawing 1027 being a version of the synthetically-annotated drawing 1022 without annotations. The synthetically-annotated drawing 1022 can be provided as an input layer of the neural network 1023 along with the estimated annotation mask from the first module 1023 of the first neural network. The input layer can be provided to hidden layers of the second module 1033 of the first neural network.

In the event the architecture of the second module 1033 of the first neural network follows the convolution/deconvolution description of above, the hidden layers of the second module 1033 of the first neural network may include a contracting phase comprising one or more of convolutional layers, concatenation layers, sub sampling layers, pooling layers, batch normalization layers, and activation layers, among others, and an expansion phase comprising convolutional layers, concatenation layers, upsampling layers, inverse sub sampling layers, and summation layers, among others. The activation layers may employ a rectified linear unit (ReLU). An output of the hidden layers of the second module 1033 of the first neural network becomes the input for an output layer. The output layer may be a fully connected layer, in an example. An edited image 1026 can then be output from the second module 1033 of the first neural network and compared with the corresponding cleaned drawing 1027 at step 1028″. In practice, a loss function defined therebetween can be evaluated at step 1028″ to determine if stopping criteria of the training phase 86i0 have been met. If it is determined that an error criterion is met and the loss function has been minimized, or stopping criteria have otherwise been met, the second module 1033 of the first neural network is determined to be sufficiently trained and ready for implementation with unknown, real-time data. Alternatively, if it is determined that the error criterion is not met and the loss function has not been minimized, or stopping criteria have otherwise not been met, the training phase 860 is repeated and updates are made to weights/coefficients of the second module 1033 of the first neural network.

According to an embodiment, the loss function of the second module 1033 of the first neural network can be defined as the mean square error between the edited image output from the second module 1033 of the first neural network (image$_{NN}$) and the corresponding cleaned image (image$_{cleaned}$), or $$\frac{1}{n}\sum_{i=1}^{n}(image_{cleaned} - image_{NN})^2$$

where n is the number for the training data. This loss can be minimized using optimization methods including, among others, stochastic gradient descent.

With reference now to FIG. 10B, a training phase 860 of a second neural network 1043 is described. Training the neural network 1023 begins with obtaining training data from a training database 1021. The training data can include a synthetically-annotated drawing 1022 and corresponding 'true' bounding boxes 1037. The 'true' bounding boxes 1037 may be human-labeled, for instance, annotations. The synthetically-annotated drawing 1022 can be provided as an input layer of the second neural network 1043. The input layer can be provided to hidden layers of the second neural network 1043. In the event the architecture of the second neural network 1043 follows the convolution/deconvolution description of above, the hidden layers of the second neural network 1043 may include a contracting phase comprising one or more of convolutional layers, concatenation layers, sub sampling layers, pooling layers, batch normalization layers, and activation layers, among others, and an expansion phase comprising convolutional layers, concatenation layers, upsampling layers, inverse sub sampling layers, and summation layers, among others. The activation layers may employ a rectified linear unit (ReLU). An output of the hidden layers of the second neural network 1043 becomes the input for an output layer. The output layer may be a fully connected layer, in an example. An estimation of bounding boxes can be generated at 1029. The estimated bounding boxes 1029 can be compared with the 'true' bounding boxes 1037 at step 1028 in order to calculate an error between target values (i.e., 'true' values of the training data) and the estimated values. This error can be evaluated at 1028 and allows the at least one neural network to iteratively update and improve its predictive power. In practice, a loss function defined therebetween can be evaluated to determine if stopping criteria of the training phase 860 have been met. If it is determined that an error criterion is met and the loss function has been minimized, or stopping criteria have otherwise been met, the second neural network 1043 is determined to be sufficiently trained and ready for implementation with unknown, real-time data. Alternatively, if it is determined that the error criterion is not met and the loss function has not been minimized, or stopping criteria have otherwise not been met, the training phase 860 is repeated and updates are made to weights/coefficients of the second neural network 1043.

According to an embodiment, the loss function of the neural network 1023 can be defined as the mean square error between the estimated bounding boxes image output from the second neural network 1043 (image$_{NN}$) and the corresponding 'true' bounding boxes image (image$_{true}$), or $$\frac{1}{n}\sum_{i=1}^{n}(image_{true} - image_{NN})^2$$

where n is the number for the training data. This loss can be minimized using optimization methods including, among others, stochastic gradient descent.

Training phase 860 for each of FIG. 10A and FIG. 10B will now be described with reference to FIG. 11 through FIG. 14B. It should be appreciated that, while described above as having different loss functions, neural networks of FIG. 10A and FIG. 10B may be implemented together during deployment.

Figure 11:
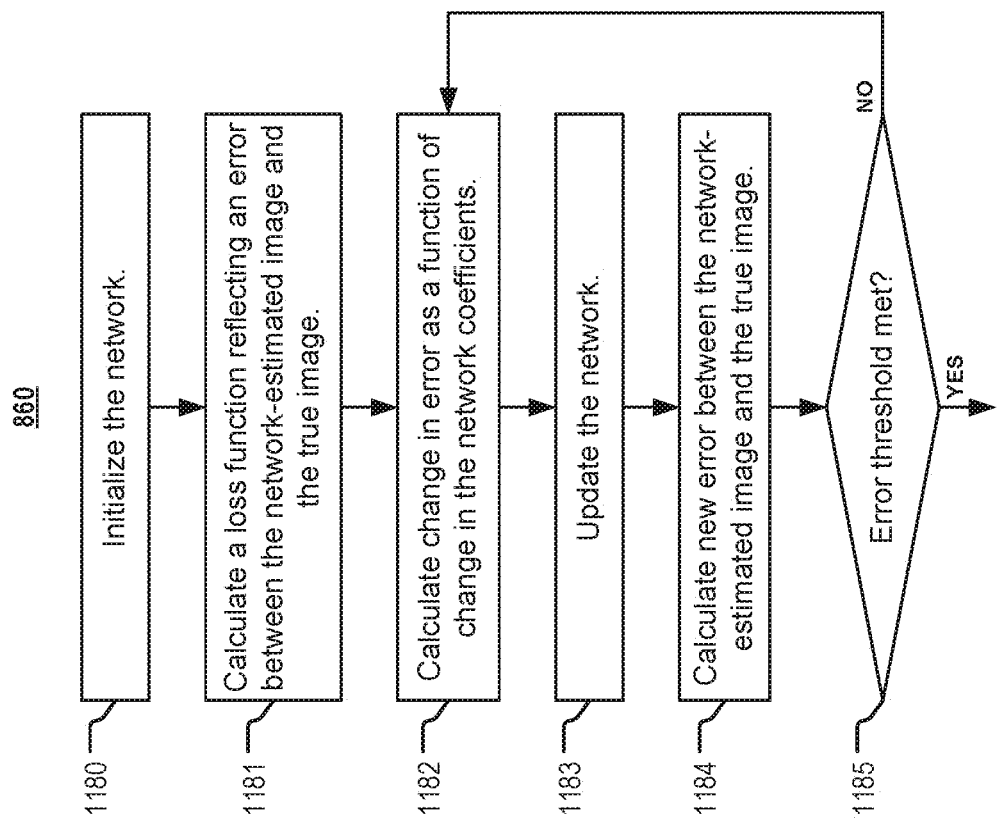
FIG. 11 is a flow diagram of a training phase of a method for searching an image database, according to an exemplary embodiment of the present disclosure.

The description of FIG. 11 through FIG. 14B can be generalized, as would be understood by one of ordinary skill in the art. FIG. 11 shows a flow diagram of one implementation of the training phase performed during optimization of the neural networks described herein.

During the training phase, representative data from the training data database are used as training data to train a neural network, resulting in an optimized neural network being output from the training phase. The term "data" here can refer to an image of the training image database. In an example using training images for data, the training phase of FIG. 10A and FIG. 10B can be an offline training method that trains a neural network using a large number of synthetic training images that are paired with corresponding cleaned images and annotation masks to train a neural network to estimate an cleaned image and an annotation mask, respectively.

During the training phase, a training database is accessed to obtain a plurality of datasets and the network is iteratively updated to reduce the error (e.g., the value produced by a loss function), wherein updating the network includes iteratively updating values of, for example, network coefficients, at each layer of the neural network, such that the synthetically-annotated data processed by the neural network, increasingly, closely matches the target. In other words, neural network infers the mapping implied by the training data, and the loss function, or cost function, produces an error value related to the mismatch between the target and the output of the current iteration of the neural network. For example, in certain implementations, the loss function can use the mean-square error to minimize the average squared error. In the case of a multilayer perceptron (MLP) neural network, the backpropagation algorithm can be used for training the network by minimizing the mean-square-error-based loss function using a (stochastic) gradient descent method. A more-detailed discussion of updating of network coefficients can be found below.

Training a neural network model essentially means selecting one model from the set of allowed models (or, in a Bayesian framework, determining a distribution over the set of allowed models) that minimizes the cost criterion (i.e., the error value calculated using the cost function). Generally, the neural network can be trained using any of numerous algorithms for training neural network models (e.g., by applying optimization theory and statistical estimation).

For example, the optimization method used in training the neural network can use a form of gradient descent incorporating backpropagation to compute the actual gradients. This is done by taking the derivative of the cost function with respect to the network parameters and then changing those parameters in a gradient-related direction. The backpropagation training algorithm can be: a steepest descent method (e.g., with variable learning rate, with variable learning rate and momentum, and resilient backpropagation), a quasi-Newton method (e.g., Broyden-Fletcher-Goldfarb-Shanno, one step secant, and Levenberg-Marquardt), or a conjugate gradient method (e.g., Fletcher-Reeves update, Polak-Ribiére update. Powell-Beale restart, and scaled conjugate gradient). Additionally, evolutionary methods, such as gene expression programming, simulated annealing, expectation-maximization, non-parametric methods and particle swarm optimization, can also be used for training the neural network.

With reference again to FIG. 11, the flow diagram is a non-limiting example of an implementation of the training phase 860 for training the neural networks using the training data. The data in the training data can be from any training dataset within the training database.

At step 1180 of training phase 860, an initial guess is generated for the coefficients of the neural network. For example, the initial guess can be based on one of the LeCun initialization, an Xavier initialization, and a Kaiming initialization.

Step 1181 to step 860 provide a non-limiting example of an optimization method for training the neural network. In step 1181 of training phase 860, an error is calculated (e.g., using a loss function/cost function) to represent a measure of the difference (e.g., a distance measure) between the target and the output data of the neural network as applied in a current iteration of the neural network. The error can be calculated using any known cost function or distance measure between the image data, including those cost functions described above. Further, in certain implementations the error/loss function can be calculated using one or more of a hinge loss and a cross-entropy loss.

Additionally, the loss function can be combined with a regularization approach to avoid overfitting the network to the particular instances represented in the training data. Regularization can help to prevent overfitting in machine learning problems. If trained too long, and assuming the model has enough representational power, the network will learn the noise specific to that dataset, which is referred to as overfitting. In case of overfitting, the neural network becomes a poor generalization, and the variance will be large because the noise varies between datasets. The minimum total error occurs when the sum of bias and variance are minimal. Accordingly, it is desirable to reach a local minimum that explains the data in the simplest possible way to maximize the likelihood that the trained network represents a general solution, rather than a solution particular to the noise in the training data. This goal can be achieved by, for example, early stopping, weight regularization, lasso regularization, ridge regularization, or elastic net regularization.

In certain implementations, the neural network is trained using backpropagation. Backpropagation can be used for training neural networks and is used in conjunction with gradient descent optimization methods. During a forward pass, the algorithm computes the network's predictions based on the current parameters θ. These predictions are then input into the loss function, by which they are compared to the corresponding ground truth labels. During the backward pass, the model computes the gradient of the loss function with respect to the current parameters, after which the parameters are updated by taking a step size of a predefined size in the direction of minimized loss (e.g., in accelerated methods, such that the Nesterov momentum method and various adaptive methods, the step size can be selected to more quickly converge to optimize the loss function.)

The optimization method by which the backprojection is performed can use one or more of gradient descent, batch gradient descent, stochastic gradient descent, and mini-batch stochastic gradient descent. Additionally, the optimization method can be accelerated using one or more momentum update techniques in the optimization approach that results in faster convergence rates of stochastic gradient descent in deep networks, including, e.g., Nesterov momentum technique or an adaptive method, such as Adagrad sub-gradient method, an Adadelta or RMSProp parameter update variation of the Adagrad method, and an Adam adaptive optimization technique. The optimization method can also apply a second order method by incorporating the Jacobian matrix into the update step.

The forward and backward passes can be performed incrementally through the respective layers of the network. In the forward pass, the execution starts by feeding the inputs through the first layer, thus creating the output activations for the subsequent layer. This process is repeated until the loss function at the last layer is reached. During the backward pass, the last layer computes the gradients with respect to its own learnable parameters (if any) and also with respect to its own input, which serves as the upstream derivatives for the previous layer. This process is repeated until the input layer is reached.

Returning to the non-limiting example shown in FIG. 11, step 1182 of the training phase 860 determines a change in the error as a function of the change in the network can be calculated (e.g., an error gradient) and this change in the error can be used to select a direction and step size for a subsequent change in the weights/coefficients of the neural network. Calculating the gradient of the error in this manner is consistent with certain implementations of a gradient descent optimization method. In certain other implementations, this step can be omitted and/or substituted with another step in accordance with another optimization algorithm (e.g., a non-gradient descent optimization algorithm like simulated annealing or a genetic algorithm), as would be understood by one of ordinary skill in the art.

In step 1183 of the training phase 860, a new set of coefficients are determined for the neural network. For example, the weights/coefficients can be updated using the change calculated in step 1182, as in a gradient descent optimization method or an over-relaxation acceleration method.

In step 1184 of the training phase 860, a new error value is calculated using the updated weights/coefficients of the neural network.

In step 1185 of the training phase 860, predefined stopping criteria are used to determine whether the training of the network is complete. For example, the predefined stopping criteria can evaluate whether the new error and/or the total number of iterations performed exceed predefined values. For example, the stopping criteria can be satisfied if either the new error falls below a predefined threshold or if a maximum number of iterations are reached. When the stopping criteria is not satisfied, the training phase 860 will continue back to the start of the iterative loop by returning and repeating step 1182 using the new weights and coefficients (the iterative loop includes steps 1182, 1183, 1184, and 1185). When the stopping criteria are satisfied, the training phase 860 is completed.

Figure 12:
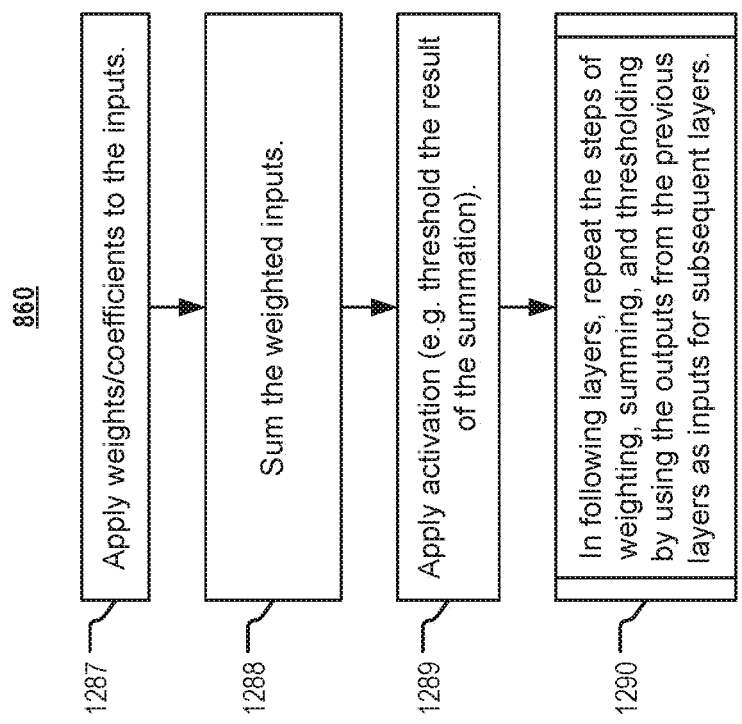
FIG. 12 is a generalized flow diagram of implementation of an artificial neural network.
Figure 13:
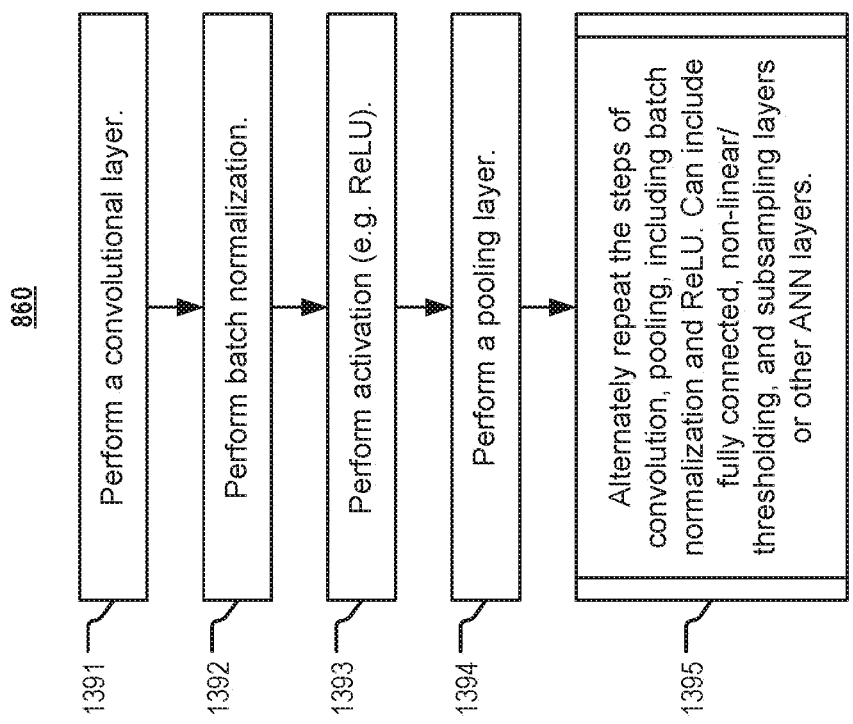
FIG. 13 is a flow diagram of implementation of a convolutional neural network, according to an exemplary embodiment of the present disclosure.

FIG. 12 and FIG. 13 show flow diagrams of implementations of neural networks, aspects of which may be incorporated into the training phase and/or the run time phase of the neural network the present disclosure. FIG. 12 is general for any type of layer in a feedforward artificial neural network (ANN), including, for example, fully connected layers. FIG. 13 is specific to convolutional layers, pooling layers, batch normalization layers, and ReLU layers in a CNN. The P3DNN can include aspects of the flow diagrams of FIG. 12 and FIG. 13, including fully connected layers, convolutional layers, pooling layers, batch normalization layers, and ReLU layers, as would be understood by one of ordinary skill in the art.

In step 1287 of training phase 860, the weights/coefficients corresponding to the connections between neurons (i.e., nodes) are applied to the respective inputs corresponding to, for example, the pixels of the training image.

In step 1288, the weighted inputs are summed. When the only non-zero weights/coefficients connecting to a given neuron on the next layer are regionally localized in an image represented in the previous layer, the combination of step 1287 and step 1288 is essentially identical to performing a convolution operation.

In step 1289, respective thresholds are applied to the weighted sums of the respective neurons.

In sub process 1290, the steps of weighting, summing, and thresholding are repeated for each of the subsequent layers.

FIG. 13 shows a flow diagram of another implementation of the neural network. The implementation of the neural network shown in FIG. 13 corresponds to operating on the training image at a hidden layer using a non-limiting implementation of the neural network.

In step 1391, the calculations for a convolution layer are performed as discussed in the foregoing and in accordance with the understanding of convolution layers of one of ordinary skill in the art.

In step 1392, following convolution, batch normalization can be performed to control for variation in the output of the previous layer, as would be understood by one of ordinary skill in the art.

In step 1393, following batch normalization, activation is performed according to the foregoing description of activation and in accordance with the understanding of activation of one of ordinary skill in the art. In an example, the activation function is a rectified activation function or, for example, a ReLU, as discussed above.

In another implementation, the ReLU layer of step 1393 may be performed prior to the batch normalization layer of step 1392.

In step 1394, the outputs from the convolution layer, following batch normalization and activation, are the inputs into a pooling layer that is performed according to the foregoing description of pooling layers and in accordance with the understanding of pooling layers of one of ordinary skill in the art.

In process 1395, the steps of a convolution layer, pooling layer, batch normalization layer, and ReLU layer can be repeated in whole or in part for a predefined number of layers. Following (or intermixed with) the above-described layers, the output from the ReLU layer can be fed to a predefined number of ANN layers that are performed according to the description provided for the ANN layers in FIG. 11.

Figure 14A:
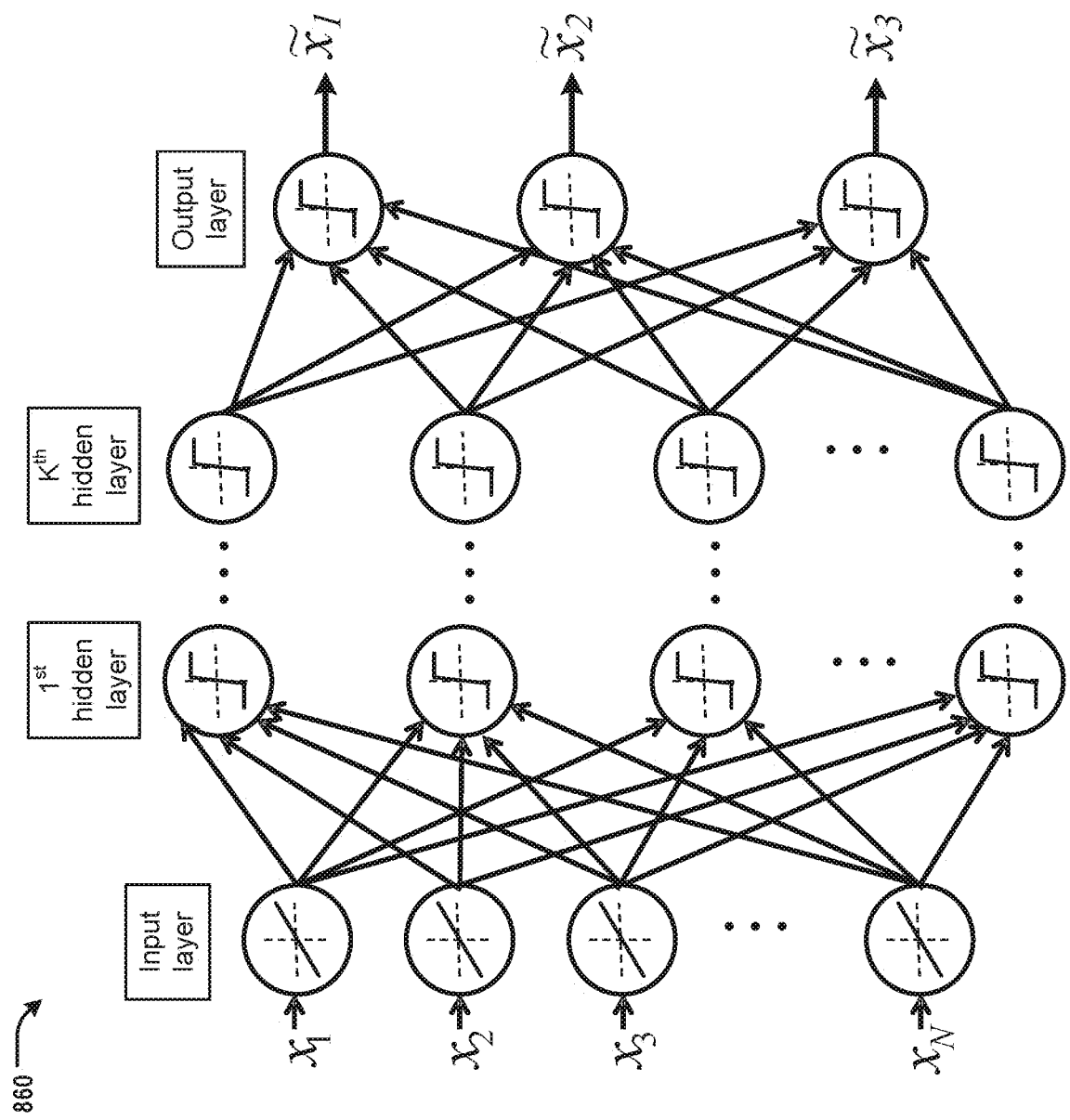
FIG. 14A is an example of a feedforward artificial neural network.
Figure 14B:
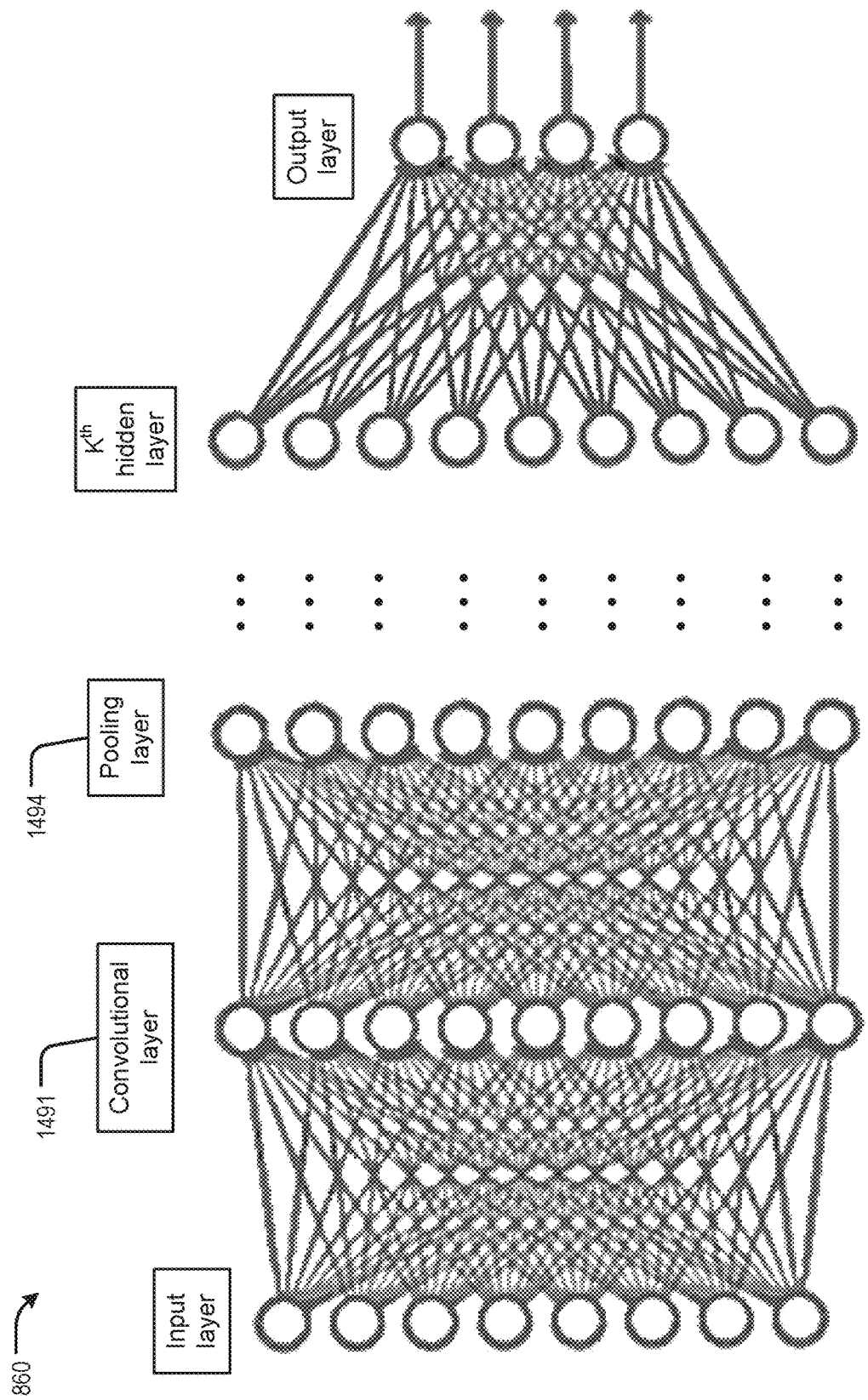
FIG. 14B is an example of a convolutional neural network, according to an embodiment of the present disclosure.

FIG. 14A and FIG. 14B show various examples of the inter-connections between layers in the neural network. The neural network can include, in an example, fully connected layers, convolutional layers, sub sampling layers, concatenating layers, pooling layers, batch normalization layers, and activation layers, all of which are explained above and below. In certain preferred implementations of the neural network, convolutional layers are placed close to the input layer, whereas fully connected layers, which perform the high-level reasoning, are placed further down the architecture towards the loss function. Pooling layers can be inserted after convolutions and provide a reduction lowering the spatial extent of the filters, and thus the amount of learnable parameters. Batch normalization layers regulate gradient distractions to outliers and accelerate the learning process. Activation functions are also incorporated into various layers to introduce nonlinearity and enable the network to learn complex predictive relationships. The activation function can be a saturating activation function (e.g., a sigmoid or hyperbolic tangent activation function) or rectified activation function (e.g., ReLU discussed above).

FIG. 14A shows an example of a general ANN having N inputs, K hidden layers, and three outputs. Each layer is made up of nodes (also called neurons), and each node performs a weighted sum of the inputs and compares the result of the weighted sum to a threshold to generate an output. ANNs make up a class of functions for which the members of the class are obtained by varying thresholds, connection weights, or specifics of the architecture such as the number of nodes and/or their connectivity. The nodes in an ANN can be referred to as neurons (or as neuronal nodes), and the neurons can have inter-connections between the different layers of the ANN system. The simplest ANN has three layers and is called an autoencoder. The neural network can have more than three layers of neurons and have as many output neurons $\mathcal{X}$ as input neurons, wherein N is the number of, for example, pixels in the training image volume. The synapses (i.e., the connections between neurons) store values called "weights" (also interchangeably referred to as "coefficients" or "weighting coefficients") that manipulate the data in the calculations. The "weights" of the present disclosure are described by the cascaded weight previously detailed. The outputs of the ANN depend on three types of parameters' (i) the interconnection pattern between the different layers of neurons, (ii) the learning process for updating the weights of the interconnections, and (iii) the activation function that converts a neuron's weighted input to its output activation.

Mathematically, a neuron's network function m(x) is defined as a composition of other functions $n_i(x)$, which can be further defined as a composition of other functions. This can be conveniently represented as a network structure, with arrows depicting the dependencies between variables, as shown in FIG. 14A and FIG. 14B. For example, the ANN can use a nonlinear weighted sum, wherein $m(x)=K(\Sigma_i w_i n_i(x))$ and where K (commonly referred to as the activation function) is some predefined function, such as the hyperbolic tangent.

In FIG. 14A (and similarly in FIG. 14B), the neurons (i.e., nodes) are depicted by circles around a threshold function. For the non-limiting example shown in FIG. 14A, the inputs are depicted as circles around a linear function and the arrows indicate directed communications between neurons. In certain implementations, the neural network is a feedforward network.

The P3DNN of the present disclosure operates to achieve a specific task, such as estimating a cleaned image, by searching within the class of functions F to learn, using a set of observations, to find $m^* \in F$, which solves the specific task in some optimal sense (e.g., stopping criteria). For example, in certain implementations, this can be achieved by defining a cost function $C:F \rightarrow m$ such that, for the optimal solution $m^*$, $C(m^*) \leq C(m) \forall m \in F$ (i.e., no solution has a cost less than the cost of the optimal solution). The cost function C is a measure of how far away a particular solution is from an optimal solution to the problem to be solved (e.g., the error). Learning algorithms iteratively search through the solution space to find a function that has the smallest possible cost. In certain implementations, the cost is minimized over a sample of the data (i.e., the training data).

FIG. 14B shows a non-limiting example in which the neural network is a CNN. CNNs are a type of ANN that have beneficial properties for image processing and, therefore, have special relevancy for applications of image denoising. CNNs use feed-forward ANNs in which the connectivity pattern between neurons can represent convolutions in image processing. For example, CNNs can be used for image-processing optimization by using multiple layers of small neuron collections which process portions of the input image, called receptive fields. The outputs of these collections can then be tiled so that they overlap to obtain a better representation of the original image. This processing pattern can be repeated over multiple layers having convolution and pooling layers, as shown, and can include batch normalization and activation layers.

As generally applied above, following after a convolution layer, a CNN can include local and/or global pooling layers which combine the outputs of neuron clusters in the convolution layers. Additionally, in certain implementations, the CNN can also include various combinations of convolutional and fully connected layers, with pointwise nonlinearity applied at the end of or after each layer.

Figure 15:
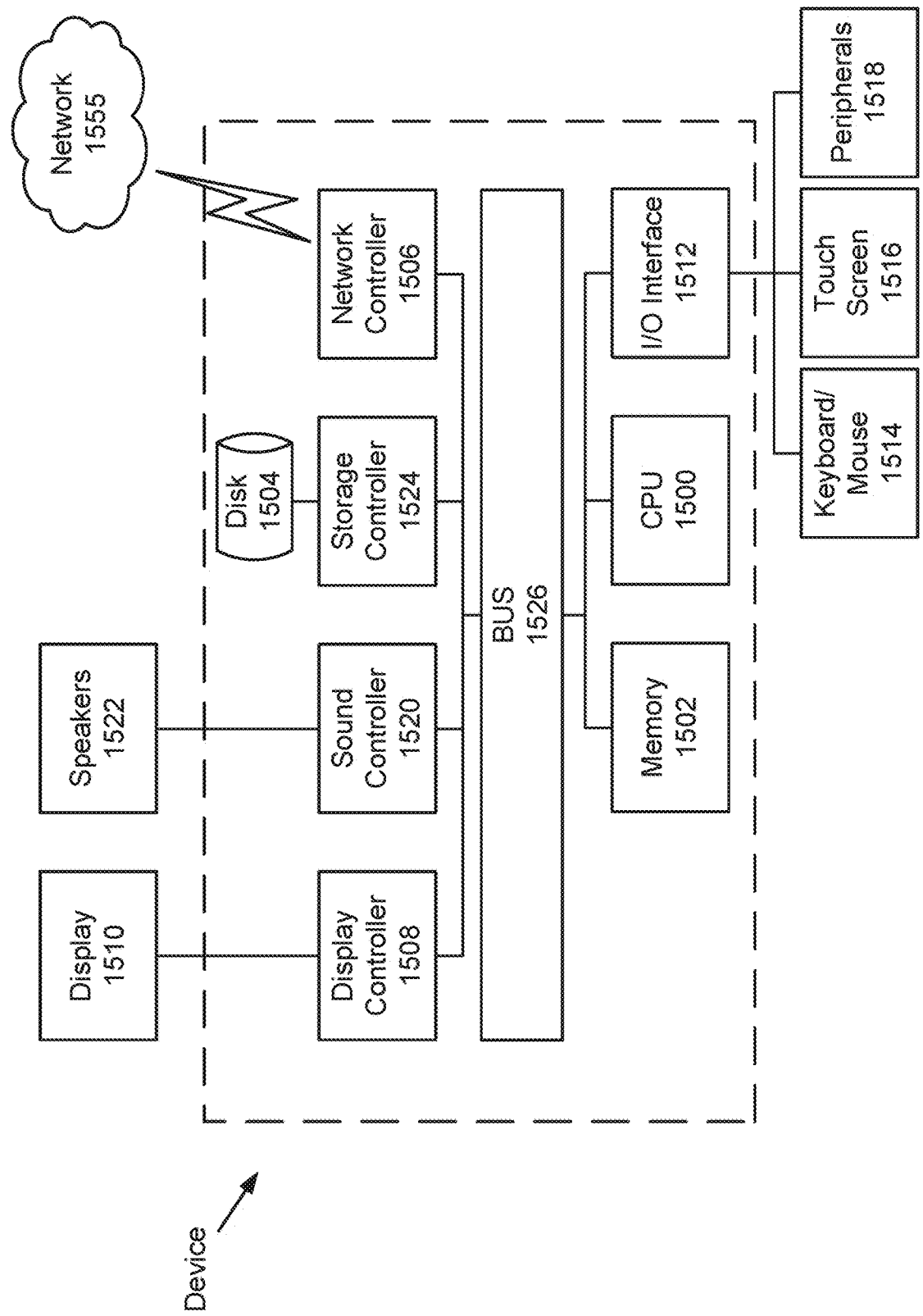
FIG. 15 is a schematic of a hardware configuration of a device for performing a method for searching images, according to an exemplary embodiment of the present disclosure.

Next, a hardware description of the apparatus, or device, for searching images according to exemplary embodiments, is described with reference to FIG. 15. In FIG. 15, the device includes a CPU 1500 which performs the processes described above/below. The process data and instructions may be stored in memory 1502. These processes and instructions may also be stored on a storage medium disk 1504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device communicates, such as a server or computer.

Further, the claimed advancements may be provided as a utility application, background daemon, or component of an operating system, or combination thereof, executing in conjunction with CPU 1500 and an operating system such as Microsoft Windows, Microsoft Windows 7, Microsoft Windows 10, UNIX, Solaris, LINUX, Apple MAC-OS and other systems known to those skilled in the art.

The hardware elements in order to achieve the device may be realized by various circuitry elements, known to those skilled in the art. For example, CPU 1500 may be a Xenon or Core processor from Intel of America or an Opteron processor from AMD of America, or may be other processor types that would be recognized by one of ordinary skill in the art. Alternatively, the CPU 1500 may be implemented on an FPGA, ASIC, PLD or using discrete logic circuits, as one of ordinary skill in the art would recognize. Further, CPU 1500 may be implemented as multiple processors cooperatively working in parallel to perform the instructions of the inventive processes described above.

The device in FIG. 15 also includes a network controller 1506, such as an Intel Ethernet PRO network interface card from Intel Corporation of America, for interfacing with network 1555. As can be appreciated, the network 1555 can be a public network, such as the Internet, or a private network such as an LAN or WAN network, or any combination thereof and can also include PSTN or ISDN sub-networks. The network 1555 can also be wired, such as an Ethernet network, or can be wireless such as a cellular network including EDGE, 3G and 4G wireless cellular systems. The wireless network can also be WiFi, Bluetooth, or any other wireless form of communication that is known.

The device further includes a display controller 1508, such as a NVIDIA GeForce GTX or Quadro graphics adaptor from NVIDIA Corporation of America for interfacing with display 1510, such as a Hewlett Packard HPL2445w LCD monitor. A general purpose I/O interface 1512 interfaces with a keyboard and/or mouse 1514 as well as a touch screen panel 1516 on or separate from display 1510. General purpose I/O interface also connects to a variety of peripherals 1518 including printers and scanners, such as an OfficeJet or DeskJet from Hewlett Packard.

A sound controller 1520 is also provided in the device, such as Sound Blaster X-Fi Titanium from Creative, to interface with speakers/microphone 1522 thereby providing sounds and/or music.

The general purpose storage controller 1524 connects the storage medium disk 1504 with communication bus 1526, which may be an ISA, EISA, VESA, PCI, or similar, for interconnecting all of the components of the device. A description of the general features and functionality of the display 1510, keyboard and/or mouse 1514, as well as the display controller 1508, storage controller 1524, network controller 1506, sound controller 1520, and general purpose I/O interface 1512 is omitted herein for brevity as these features are known.

Obviously, numerous modifications and variations are possible in light of the above teachings. It is therefore to be understood that within the scope of the appended claims, embodiments of the present disclosure may be practiced otherwise than as specifically described herein.

Embodiments of the present disclosure may also be as set forth in the following parentheticals.

(1) A method for searching an image database, comprising receiving, by processing circuitry, an adulterated image of an object, the adulterated image including object annotations for visual reference, applying, by the processing circuitry, a first neural network to the adulterated image, correlating, by the processing circuitry, a result of the applying the first neural network with each image of a reference database of images, the result including an edited image of the object and each image of the reference database of images including a reference object, and selecting, by the processing circuitry and as a matching image, one or more images of the reference database of images having correlation values above a threshold correlation value.

(2) The method according to (1), wherein the applying the first neural network includes editing, by the processing circuitry, the adulterated image to remove the object annotations, an output of the editing being the edited image of the object.

(3) The method according to either (1) or (2), further comprising applying, by the processing circuitry, a masking process to the adulterated image.

(4) The method according to any one of (1) to (3), wherein the applying the masking process includes performing, by the processing circuitry and via a second neural network, object recognition on the adulterated image to recognize text-based descriptive features, applying, by the processing circuitry and based on the performing the object recognition, computer vision to detect callout features relative to bounding boxes containing the recognized text-based descriptive features, and generating, by the process circuitry and based on the bounding boxes and the detected callout features, a contour mask of the object.

(5) The method according to any one of (1) to (4), further comprising editing, by the processing circuitry, the adulterated image based on the result of the applying the first neural network and a result of the applying the masking process, the result of the applying the masking process being the generated contour mask of the object.

(6) The method according to any one of (1) to (5), wherein the first neural network is a convolutional neural network configured to perform pixel-level classification.

(7) The method according to any one of (1) to (6), wherein the generating the contour mask of the object includes applying, by the processing circuitry, object segmentation to the adulterated image.

(8) A non-transitory computer-readable storage medium storing computer-readable instructions that, when executed by a computer, cause the computer to perform a method for searching an image database, comprising receiving an adulterated image of an object, the adulterated image including object annotations for visual reference, applying a first neural network to the adulterated image, correlating a result of the applying the first neural network with each image of a reference database of images, the result including an edited image of the object and each image of the reference database of images including a reference object, and selecting, as a matching image, one or more images of the reference database of images having correlation values above a threshold correlation value.

(9) The non-transitory computer-readable storage medium according to (8), wherein the applying the first neural network includes editing the adulterated image to remove the object annotations, an output of the editing being the edited image of the object.

(10) The non-transitory computer-readable storage medium according to either (8) or (9), further comprising applying a masking process to the adulterated image.

(11) The non-transitory computer-readable storage medium according to any one of (8) to (10), wherein the applying the masking process includes performing, via a second neural network, object recognition on the adulterated image to recognize text-based descriptive features, applying, based on the performing the object recognition, computer vision to detect callout features relative to bounding boxes containing the recognized text-based descriptive features, and generating, based on the bounding boxes and the detected callout features, a contour mask of the object.

(12) The non-transitory computer-readable storage medium according to any one of (8) to (11), further comprising editing the adulterated image based on the result of the applying the first neural network and a result of the applying the masking process, the result of the applying the masking process being the generated contour mask of the object.

(13) The non-transitory computer-readable storage medium according to any one of (8) to (12), wherein the first neural network is a convolutional neural network configured to perform pixel-level classification.

(14) The non-transitory computer-readable storage medium according to any one of (8) to (13), wherein the generating the contour mask of the object includes applying object segmentation to the adulterated image.

(15) An apparatus for performing a method for searching an image database, comprising processing circuitry configured to receive an adulterated image of an object, the adulterated image including object annotations for visual reference, apply a first neural network to the adulterated image, correlate a result of the applying the first neural network with each image of a reference database of images, the result including an edited image of the object and each image of the reference database of images including a reference object, and select, as a matching image, one or more images of the reference database of images having correlation values above a threshold correlation value.

(16) The apparatus according to (15), wherein the processing circuitry is further configured to apply the first neural network by editing the adulterated image to remove the object annotations, an output of the editing being the edited image of the object.

(17) The apparatus according to either (15) or (16), wherein the processing circuitry is further configured to apply a masking process to the adulterated image.

(18) The apparatus according to any one of (15) to (17), wherein the processing circuitry is further configured to apply the masking process by performing, via a second neural network, object recognition on the adulterated image to recognize text-based descriptive features, applying, based on the performing the object recognition, computer vision to detect callout features relative to bounding boxes containing the recognized text-based descriptive features, and generating, based on the bounding boxes and the detected callout features, a contour mask of the object.

(19) The apparatus according to any one of (15) to (18), wherein the processing circuitry is further configured to edit the adulterated image based on the result of the applying the first neural network and a result of the applying the masking process, the result of the applying the masking process being the generated contour mask of the object.

(20) The apparatus according to any one of (15) to (19), wherein the processing circuitry is further configured to generate the contour mask of the object by applying object segmentation to the adulterated image.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. A method for searching an image database, comprising:
receiving, by processing circuitry, an adulterated image of an object, the adulterated image including object annotations for visual reference;
applying, by the processing circuitry, a first neural network to the adulterated image;
correlating, by the processing circuitry, a result of the applying the first neural network with each image of a reference database of images, the result including an edited image of the object and each image of the reference database of images including a reference object; and
selecting, by the processing circuitry and as a matching image, one or more images of the reference database of images having correlation values above a threshold correlation value, wherein the method further comprises
applying, by the processing circuitry, a masking process to the adulterated image, including
performing, by the processing circuitry and via a second neural network, object recognition on the adulterated image to recognize text-based descriptive features,
applying, by the processing circuitry and based on the performing the object recognition, computer vision to detect callout features relative to bounding boxes containing the recognized text-based descriptive features, and
generating, by the process circuitry and based on the bounding boxes and the detected callout features, a contour mask of the object.

2. The method according to claim 1, wherein the applying the first neural network includes
editing, by the processing circuitry, the adulterated image to remove the object annotations, an output of the editing being the edited image of the object.

3. The method according to claim 1, further comprising editing, by the processing circuitry, the adulterated image based on the result of the applying the first neural network and a result of the applying the masking process, the result of the applying the masking process being the generated contour mask of the object.

4. The method according to claim 1, wherein the first neural network is a convolutional neural network configured to perform pixel-level classification.

5. The method according to claim 1, wherein the generating the contour mask of the object includes
applying, by the processing circuitry, object segmentation to the adulterated image.

6. A non-transitory computer-readable storage medium storing computer-readable instructions that, when executed by a computer, cause the computer to perform a method for searching an image database, comprising:
receiving an adulterated image of an object, the adulterated image including object annotations for visual reference;
applying a first neural network to the adulterated image;
correlating a result of the applying the first neural network with each image of a reference database of images, the result including an edited image of the object and each image of the reference database of images including a reference object; and
selecting, as a matching image, one or more images of the reference database of images having correlation values above a threshold correlation value, wherein the method further comprises
applying a masking process to the adulterated image, including
performing, via a second neural network, object recognition on the adulterated image to recognize text-based descriptive features,
applying, based on the performing the object recognition, computer vision to detect callout features relative to bounding boxes containing the recognized text-based descriptive features, and
generating, based on the bounding boxes and the detected callout features, a contour mask of the object.

7. The non-transitory computer-readable storage medium according to claim 6, wherein the applying the first neural network includes
editing the adulterated image to remove the object annotations, an output of the editing being the edited image of the object.

8. The non-transitory computer-readable storage medium according to claim 6, further comprising
editing the adulterated image based on the result of the applying the first neural network and a result of the applying the masking process, the result of the applying the masking process being the generated contour mask of the object.

9. The non-transitory computer-readable storage medium according to claim 6, wherein the first neural network is a convolutional neural network configured to perform pixel-level classification.

10. The non-transitory computer-readable storage medium according to claim 6, wherein the generating the contour mask of the object includes
applying object segmentation to the adulterated image.

11. An apparatus for performing a method for searching an image database, comprising:
processing circuitry configured to
receive an adulterated image of an object, the adulterated image including object annotations for visual reference,
apply a first neural network to the adulterated image,
correlate a result of the applying the first neural network with each image of a reference database of images, the result including an edited image of the object and each image of the reference database of images including a reference object, and
select, as a matching image, one or more images of the reference database of images having correlation values above a threshold correlation value, wherein the processing circuitry is further configured to
apply a masking process to the adulterated image by
performing, via a second neural network, object recognition on the adulterated image to recognize text-based descriptive features,
applying, based on the performing the object recognition, computer vision to detect callout features relative to bounding boxes containing the recognized text-based descriptive features, and generating, based on the bounding boxes and the detected callout features, a contour mask of the object.

12. The apparatus according to claim 11, wherein the processing circuitry is further configured to apply the first neural network by editing the adulterated image to remove the object annotations, an output of the editing being the edited image of the object.

13. The apparatus according to claim 11, wherein the processing circuitry is further configured to edit the adulterated image based on the result of the applying the first neural network and a result of the applying the masking process, the result of the applying the masking process being the generated contour mask of the object.

14. The apparatus according to claim 11, wherein the processing circuitry is further configured to generate the contour mask of the object by applying object segmentation to the adulterated image.

* * * * *